US011136780B2

(12) United States Patent
Kersten et al.

(10) Patent No.: US 11,136,780 B2
(45) Date of Patent: Oct. 5, 2021

(54) ANNULAR BRACKET FOR EXTERNALLY LOADING A TOWER SEGMENT, EXTERNAL LOADING SYSTEM OF A HYBRID TOWER, TOWER SECTION OF A HYBRID TOWER, HYBRID TOWER, WIND TURBINE, AND ASSEMBLY METHOD OF AN EXTERNAL LOADING SYSTEM FOR A HYBRID TOWER

(71) Applicant: Wobben Properties GmbH, Aurich (DE)

(72) Inventors: Roy Kersten, Hohenwarthe (DE); Steffen Röthel, Emden (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/757,956

(22) PCT Filed: Oct. 23, 2018

(86) PCT No.: PCT/EP2018/079006
§ 371 (c)(1),
(2) Date: Apr. 21, 2020

(87) PCT Pub. No.: WO2019/081491
PCT Pub. Date: May 2, 2019

(65) Prior Publication Data
US 2020/0263446 A1     Aug. 20, 2020

(30) Foreign Application Priority Data
Oct. 26, 2017   (DE) .................... 10 2017 125 060.3

(51) Int. Cl.
*E04H 12/08*       (2006.01)
*F03D 13/20*       (2016.01)
(Continued)

(52) U.S. Cl.
CPC ........... *E04H 12/085* (2013.01); *E04H 12/12* (2013.01); *E04H 12/16* (2013.01); *F03D 13/20* (2016.05)

(58) Field of Classification Search
CPC ....... F03D 13/20; E04H 12/16; E04H 12/085; E04H 12/12
See application file for complete search history.

(56) References Cited

U.S. PATENT DOCUMENTS

| 7,114,295 B2 | 10/2006 | Wobben |
| 9,032,674 B2 | 5/2015 | Schibsbye |

(Continued)

FOREIGN PATENT DOCUMENTS

| CN | 104121155 A | 10/2014 |
| CN | 106121346 A | 11/2016 |

(Continued)

*Primary Examiner* — Andrew J Triggs
(74) *Attorney, Agent, or Firm* — Seed IP Law Group LLP

(57) ABSTRACT

An annular bracket for the external tensioning of a tower segment, in particular a tower segment of a wind power plant, to an external tensioning system of a hybrid tower, preferably a hybrid tower of a wind power plant, to a tower section of a hybrid tower, preferably a hybrid tower of a wind power plant, to a hybrid tower, preferably a hybrid tower of a wind power plant, to a wind power plant, and to an assembly method of an external tensioning system for a hybrid tower, preferably for a hybrid tower of a wind power plant. An annular bracket for the external tensioning of a tower segment, in particular a tower segment of a wind power plant, with a connector element for the connection of a tensioning element, a bearing element for the transmission of a tensioning force to a tower segment, and an annular force transmission element for the transmission of the tensioning force between the connector element and the bearing element, the bearing element being at a greater spacing in (Continued)

the radial direction from a longitudinal axis of the annular bracket than the connector element, is described.

17 Claims, 21 Drawing Sheets

(51) Int. Cl.
 *E04H 12/12* (2006.01)
 *E04H 12/16* (2006.01)

(56) References Cited

U.S. PATENT DOCUMENTS

| | | |
|---|---|---|
| 9,243,418 B2 * | 1/2016 | Bogl ..................... E04H 12/12 |
| 2011/0113708 A1 | 5/2011 | Skjaerbaek et al. |
| 2011/0138707 A1 | 6/2011 | Bagepalli |
| 2012/0266552 A1 | 10/2012 | Huynh Tong et al. |
| 2016/0169209 A1 | 6/2016 | Coordes et al. |
| 2016/0312431 A1 | 10/2016 | Coordes |
| 2020/0263446 A1 * | 8/2020 | Kersten ................ E04H 12/085 |

FOREIGN PATENT DOCUMENTS

| | | |
|---|---|---|
| DE | 10033845 A1 | 1/2002 |
| DE | 10230273 B3 | 2/2004 |
| DE | 102012001109 A1 | 7/2013 |
| DE | 102013226536 A1 | 6/2015 |
| DE | 102016203494 A1 | 7/2017 |
| EP | 2807317 B1 | 12/2015 |
| EP | 2339094 B1 | 6/2016 |
| JP | 2000213451 A | 8/2000 |
| JP | 2013528730 A | 7/2013 |
| WO | 2014/037421 A1 | 3/2014 |
| WO | 2014/202733 A1 | 12/2014 |
| WO | 2015/090861 A1 | 6/2015 |

\* cited by examiner

ANNULAR BRACKET FOR EXTERNALLY LOADING A TOWER SEGMENT, EXTERNAL LOADING SYSTEM OF A HYBRID TOWER, TOWER SECTION OF A HYBRID TOWER, HYBRID TOWER, WIND TURBINE, AND ASSEMBLY METHOD OF AN EXTERNAL LOADING SYSTEM FOR A HYBRID TOWER

BACKGROUND

Technical Field

The invention relates to an annular bracket for the external tensioning of a tower segment, in particular a tower segment of a wind power plant, to an external tensioning system of a hybrid tower, preferably a hybrid tower of a wind power plant, to a tower section of a hybrid tower, preferably a hybrid tower of a wind power plant, to a hybrid tower, preferably a hybrid tower of a wind power plant, to a wind power plant, and to an assembly method of an external tensioning system for a hybrid tower, preferably for a hybrid tower of a wind power plant.

Description of the Related Art

Hybrid towers are known and as a rule comprise at least one tower segment made from reinforced concrete or prestressed concrete and at least one tower segment made from steel. As a rule, starting from a foundation, hybrid towers comprise a lower tower section with one or more tower segments made from reinforced concrete or prestressed concrete, and an upper tower section which is arranged thereon with one or more tower segments made from steel. A tower section can comprise one tower segment or a plurality of tower segments. A tower segment can in turn comprise one or more part segments.

Hybrid towers are preferably used in the case of high towers. Hybrid towers are used, for example, for broadcasting towers, television towers or wind power plants. On account of the great heights to be reached, hybrid towers are of interest, in particular, for the use of wind power plants, since the possible wind yield increases at the greater heights. In the case of wind power plants, a nacelle can be arranged on the upper tower section, or the upper tower section can comprise a nacelle.

Hybrid towers are subjected to operating forces which change in a manner which is dependent on wind and/or weather conditions. In order to conduct the operating forces which are introduced via the hybrid tower into the foundation, the upper tower section made from steel is as a rule connected to the lower tower section made from reinforced concrete or prestressed concrete. As a rule, the connection absorbs, inter alia, tensile and/or compressive and/or bending loads which result from the operating forces.

DE 102 30 273 B3 discloses a tower of a wind power plant with a connecting piece between a lower tubular prestressed concrete part and an upper tubular steel part. EP 2 807 317 B1 discloses a hybrid tower with a tubular lower tower section which consists of concrete, a tubular upper section which consists of steel, and with an adapter which is arranged between the two tower sections for the connection of the two tower sections. DE 100 33 845 A1 describes a method for erecting a tower consisting of prestressed concrete prefabricated parts and an apparatus for carrying out the method. DE 10 2013 226 536 A1 and WO 2015/090861 A1 discloses an arrangement with a concrete foundation and a tower for supporting a nacelle of a wind power plant, the tower comprising a number of tower segments which are arranged along a tower axis, and at least an uppermost tower segment comprising a head flange and a base flange, an uppermost tower segment of the number of tower segments being formed as a steel element; and a number of tensioning or tensile strands bracing the concrete foundation with the head flange of the uppermost tower segment under tensile stress.

Known constructions of hybrid towers are often associated with high costs, for example, in the production of molds, and a high technological complexity, for example, in the case of prestressing and pressing tensioning strands in prestressed concrete prefabricated parts. Moreover, the prestress of prestressed tower segments and/or tower sections and/or hybrid towers frequently cannot be adapted and/or corrected on site, or can be adapted and/or corrected on site only with a relatively high use of personnel and time and by means of expensive technical means.

The German Patent and Trade Mark Office has searched the following prior art in the priority application in respect of the present application: DE 10 2012 001 109 A1, CN 106121346 A, CN 104121155A, DE 10 2016 203 494 A1, US 2011/0138707 A1, US 2011/0113708 A1, U.S. Pat. No. 9,032,674 B2, EP 2 339 094 B1, DE 10 2013 226 536 A1, WO 2014/202733 A1.

BRIEF SUMMARY

Provided is an annular bracket for the external tensioning of a tower segment, an improved external tensioning system of a hybrid tower, an improved tower section of a hybrid tower, an improved hybrid tower, an improved wind power plant, and an improved assembly method of an external tensioning system for a hybrid tower. Furthermore, in particular, provided is an annular bracket for the external tensioning of a tower segment, an external tensioning system of a hybrid tower, a tower section of a hybrid tower, a hybrid tower, a wind power plant, and an assembly method of an external tensioning system for a hybrid tower, which makes/make external bracing and/or connecting of at least one tower segment and/or of at least one tower section and/or of a tower, in particular a hybrid tower, to a tower segment and/or a tower section and/or a foundation possible.

In accordance with a first aspect of the invention, an annular bracket for the external tensioning of the tower segment, in particular a tower segment of a wind power plant, with a connector element for the connection of a tensioning element, a bearing element for the transmission of a tensioning force to a tower segment, and an annular force transmission element for the transmission of the tensioning force between the connector element and the bearing element, the bearing element being at a greater spacing in the radial direction from a longitudinal axis of the annular bracket than the connector element.

The annular bracket serves for the external tensioning of the tower segment, in particular for the transmission of an external tensioning force to a tower segment. In conjunction with the annular bracket, the tower segment is, in particular, an upper tower segment, preferably a steel tower segment, in particular a tower segment which consists of steel or comprises steel to a large extent. The tower segment preferably has a radially inwardly directed shoulder, in particular at its lower end. The shoulder is preferably configured to receive the annular bracket. Furthermore, the annular bracket is preferably configured to be arranged on the radially inwardly directed shoulder of the tower segment. Specifications in respect of dimensions, in particular radii, of the tower segment relate, in particular, to the radially inwardly directed shoulder of the tower segment.

In the case of the external tensioning of the tower segment, tensioning elements are preferably not guided through the tower segment, in particular its wall, in comparison with the internal tensioning. In the case of the external tensioning, the tensioning elements are preferably arranged spaced apart from the wall of the tower segment or adjacently with respect to said wall. The tensioning elements are arranged, in particular, spaced apart from or adjacently with respect to the tower segment on that side of the tower segment which faces the tower interior.

In the case of the external tensioning of a tower segment, the tensioning force is introduced into the annular bracket via a tensioning element which is connected to a connector element. Via a force transmission element, the tensioning force is transmitted from the connector element to a bearing element and from there to the tower segment.

It is provided that the bearing element has a greater spacing in the radial direction from the longitudinal axis of the annular bracket than the connector element. The bearing element is therefore arranged further to the outside in the radial direction in comparison with the connector element. The force transmission element therefore transmits the tensioning force which is introduced by way of the tensioning element from the radially further inward lying connector element to the further outward lying bearing element.

In this way, tensioning elements can be arranged on the connector element radially further inward, for example, spaced apart from or adjacently with respect to that side of the tower segment which faces the tower interior, whereas at the same time the transmission of the tensioning force to the tower segment by way of the bearing element advantageously takes place further to the outside in the radial direction. Thus, for example, unfavorable introductions of force and/or moments can be avoided or reduced which can occur in the case of the external tensioning, in particular, on account of the spacing or the adjacent positioning of the tensioning elements from/with respect to that side of the tower segment which faces the tower interior. This makes it possible that external tensioning means are used in a multiplicity of towers, both as a single or additional tensioning technology in the case of the (initial) erection of towers and in the case of retrofitting of towers.

It is a further advantage that tower segments made from reinforced concrete or prestressed concrete with a lower complexity can be used, which reduces the technological complexity and the cost outlay of the production of molds of the tower segments and the production and the construction of the tower segments, facilitates the maintenance and repair of the tensioning elements and/or ensures a prestressed connection between the upper and lower tower section and/or between tower segments which are arranged next to one another and/or above one another, which prestressed connection is protected throughout service life against weather influences independently of the operating load which acts.

In accordance with a further advantage, the external tensioning elements can be arranged in the tower interior, which makes it possible for maintenance and repair work to be carried out at any time independently of wind and weather conditions. In a particularly advantageous way, no expensive technical means or reduced expensive technical means, for example, pumps for pressing the composite compound, and merely a reduced use of time and personnel are required for this purpose.

It is a further advantage that the lower tower segment or the lower tower section can be connected or even prestressed to the upper tower segment or the upper tower section, without a tower segment which is configured as an adapter or as a connecting piece being used between the upper and lower tower segment or the upper and lower tower section.

Furthermore, it is an advantage that towers and/or hybrid towers which are already in operation can be retrofitted with the annular bracket, that is to say even towers with an internally prestressed tower segment or a plurality of internally prestressed tower segments and/or with an internally prestressed tower section or with a plurality of internally prestressed tower sections. In a particularly advantageous way, even towers and/or hybrid towers, for example, with a damaged internal bracing means can be retrofitted with the annular bracket for external tensioning and can thus be operated further. Furthermore, the prestressing of the tower segments can be adapted or corrected by means of the annular bracket. In particular, by way of the use of the annular bracket, external tensioning can be made possible which is advantageous in relation to bending and/or fatigue and/or does not overload the net cross section of the concrete.

It is a further advantage that possible resulting temporary gaps between two tower segments which are arranged above one another can be prevented, if not even minimized completely, by way of the annular bracket and, in particular, by way of the specific arrangement of the connector elements and the bearing elements, in particular in the case of great operating forces which act. In particular, the annular bracket can advantageously be retrofitted with further connector elements for receiving further tensioning elements, for example, in the case of increasing operating forces.

The natural frequency behavior of the tower segment and/or of the tower section and/or of the hybrid tower is influenced merely insubstantially, if at all. Their natural frequency behavior is advantageously preferably not influenced in a disadvantageous manner, as known from arrangements and/or fastenings of blades and/or collars on the inner wall and/or on the outer wall.

In the present text, positional and locational specifications, such as "top" and "bottom" or "outside" and "inside", unless stated otherwise, relate to the installed state of a hybrid tower and, in particular, of the annular bracket which is installed in the tower section and/or hybrid tower. Thus, in the installed state, a foundation of a hybrid tower as a rule forms its lower end, and a nacelle forms its upper end. In the installed state of the annular bracket and/or the tower segment and/or the tower section and/or the hybrid tower, their longitudinal axes are preferably oriented substantially vertically and are particularly preferably arranged coaxially with respect to one another. In the case of the transport and/or in the case of maintenance and/or repair work on the hybrid tower and/or on the annular bracket and/or on the tower segment and/or on the tower section, individual longitudinal axes or all longitudinal axes can also be arranged in a non-vertical and/or non-coaxial manner. Specifications in respect of the longitudinal direction and/or in respect of the height relate to a direction which runs substantially parallel to the longitudinal axis.

The cross section of a hybrid tower in a plane orthogonal with respect to its longitudinal extent is as a rule of annular configuration. The annular bracket has an annular cross section in a plane orthogonal with respect to the longitudinal axis. A tower segment and/or a tower section also preferably has an annular cross section in a plane orthogonally with respect to the longitudinal axis.

An annular cross section can be, for example, of circular, oval or polygonal, for example, triangular or rectangular, configuration. Here, therefore, annular is understood to mean a shape which is closed over the circumference and includes a circular configuration but is not restricted to the latter.

A hybrid tower, and, as a rule, correspondingly also its tower sections and/or tower segments and/or an annular bracket, can be of cylindrical configuration, that is to say the external radius and/or internal radius are/is constant over the height. In this case, the hybrid tower and/or its tower sections and/or its tower segments do not have an inclination angle with respect to the longitudinal axis.

A hybrid tower tapers as a rule as its height increases, that is to say its external radius and/or internal radius decrease/decreases as its height increases. Said tapering can take place in a uniform or non-uniform manner. Furthermore, the tapering can be present only in individual parts of the hybrid tower or can be different in different parts of the hybrid tower. The tapering can also take place in a stepped manner. A hybrid tower and/or a tower section and/or a tower segment and/or the annular bracket can be of conical and/or frustoconical configuration completely or in sections. A hybrid tower and/or a tower section and/or a tower segment and/or the annular bracket can thus have inclination angles with respect to the longitudinal axis which are identical or different completely or in sections. In particular, for example, the inclination angles of an inner side and an outer side of a hybrid tower and/or a tower section and/or a tower segment and/or the annular bracket can be identical or can differ. An inclination angle can be oriented both radially to the inside and radially to the outside. In particular, the inclination angle is greater than 0° and/or preferably at least 1°, 5°, 10°, 15° or 20°, and at most 1°, 5°, 10°, 15° or 20°.

Hybrid towers, their tower sections and their individual tower segments typically comprise a wall with an outer wall, that is to say a side which faces away from the tower interior, and an inner wall, that is to say a side which faces the tower interior. The wall has a wall thickness which is preferably configured to absorb operating forces. The wall thickness is the thickness of the wall from the inner wall to the outer wall in the radial direction and/or in the direction of a perpendicular with respect to the inner wall. In particular, the wall thickness can vary over a height in the installed position. Furthermore, the wall thickness can preferably taper, that is to say decrease, over the height; in particular, the wall thickness can taper toward the top. The wall thickness of the wall can vary; in particular, the wall thickness of the wall can vary in the radial direction over the height. The wall thickness of the wall preferably decreases toward the top. As an alternative, the wall thickness is preferably constant over the height.

The tensioning elements preferably run parallel to a direction which is oriented parallel to a longitudinal axis of the tower segment and/or the tower section and/or the hybrid tower. The tensioning elements can also be inclined with respect to the longitudinal axis of the tower segment and/or the tower section and/or the hybrid tower. This can be preferred, in particular, if the tower segment and/or the tower section and/or the hybrid tower taper/tapers and/or are/is of conical or frustoconical configuration. An inclination angle of a tensioning element preferably corresponds to the inclination angle of the tower segment and/or the tower section and/or the hybrid tower, in particular of an inner or outer side of the wall of the tower segment and/or the tower section and/or the hybrid tower. A tensioning element can also have a different inclination angle with respect to the vertical than the tower segment and/or the tower section and/or the hybrid tower, it being preferred here that the difference in the inclination angles between the tensioning element and the tower segment and/or the tower section and/or the hybrid tower is at least or at most 1°, 2°, 3°, 5°, 7.5°, 10°, 15° or 20°. Furthermore, the tensioning element can preferably have different inclination angles with respect to different tower segments and/or different tower sections. In particular, in the case of transitions from an upper to a lower tower segment and/or from an upper to a lower tower section, the tensioning element can have different inclination angles with respect to the latter.

The tensioning elements can comprise, for example, rods and/or can be of rod-shaped configuration. The tensioning elements can comprise cables or can be of cable-shaped configuration. The tensioning elements are preferably configured from a material which consists of steel or comprises steel. Furthermore, the material of the tensioning elements can preferably consist of fibers or can comprise fibers, in particular steel fibers and/or carbon fibers and/or aramid fibers and/or ceramic fibers and/or natural fibers and/or glass fibers, etc. A tensioning element can comprise an insert and/or strands, a strand preferably comprising a plurality of wires. The insert preferably forms the core of a tensioning element. The insert is preferably surrounded by strands and/or wires. A material of the insert can comprise plastic and/or steel and/or natural and/or artificial fibers, the insert preferably being of wire-like and/or cable-like and/or bar-like and/or fiber-like and/or rod-like configuration.

The connecting element is configured for the connection of a tensioning element, in particular for the connection of a connector head of the tensioning element. The connecting element is preferably configured to be connected to the tensioning element releasably, in particular by way of a screw connection, and/or in a prestressed manner, in particular in a hydraulically prestressed manner. The tensioning element is preferably configured to be connected to the connector element releasably, in particular by way of a screw connection, and/or in a prestressed manner, in particular in a hydraulically prestressed manner.

The connector element is preferably connected to the annular force transmission element in an integrally joined manner, in particular is welded and/or adhesively bonded, and/or in a non-positive manner, in particular is screwed, and/or in a positively locking manner, in particular in the form of a plug-in connection. The connector element can also be configured integrally with the annular force transmission element.

In this description, in particular, integral is understood to mean single-piece.

The bearing element is configured for the transmission of the tensioning force to tower segments. The bearing element is preferably connected to the annular force transmission element in an integrally joined manner, in particular is welded and/or adhesively bonded, and/or in a non-positive manner, in particular is screwed, and/or in a positively locking manner, in particular in the form of a plug-in connection. The bearing element can also be configured integrally with the annular force transmission element. A lower end, in particular a lower radially outer end, of the annular force transmission element preferably configures the bearing element. The bearing element is preferably of substantially continuous or interrupted configuration in the circumferential direction. Interruptions of the bearing element and/or bearing element sections are preferably arranged equidistantly and/or distributed in the circumferential direction.

Furthermore, it is preferred that, in the radial direction, the bearing element has an extent of at least 0%, 5%, 10%, 15%, 20%, 25%, 30%, 35%, 40%, 45% or 50%, and at most 0%, 5%, 10%, 15%, 20%, 25%, 30%, 35%, 40%, 45% or 50% of a wall thickness of the tower segment. The bearing element is preferably dimensioned in a manner which is dependent on the loads and/or forces which act and/or the tower height and/or the material. For example, a bearing element can have an extent in the radial direction of from 200 to 400 mm, in particular of from 240 to 380 mm, in particular if the bearing element is configured as a concrete prefabricated part.

The annular bracket preferably has two or more tensioning elements and/or two or more connector elements and/or two or more bearing elements. The number of tensioning elements is preferably identical to the number of connector elements. The tensioning elements and/or the connector elements and/or the bearing elements are preferably spaced apart from one another equidistantly, in particular in the circumferential direction. Furthermore, a plurality of connector elements are preferably arranged in a connector plane and/or a plurality of bearing elements are arranged in a bearing plane, the connector plane and/or the bearing plane being oriented substantially horizontally and/or orthogonally with respect to the longitudinal axis. The number of connector elements and/or tensioning elements and/or bearing elements is preferably selected in a manner which is dependent on the loads which act and/or the diameter of the tensioning elements and/or the distribution thereof.

It is provided in one preferred embodiment of the annular bracket that the spacing of the connector element from the longitudinal axis in the radial direction is smaller than or equal to an internal radius of the tower segment.

This makes it possible to guide and/or to arrange the tensioning element in the tower interior, preferably without guiding the tensioning element through the tower segment, in particular its wall. The connector element is preferably arranged at a spacing from the longitudinal axis which is such that a tensioning element which is connected to the connector element is spaced apart from or adjacent with respect to a side of the tower segment, which side faces the tower interior.

The internal radius of the tower segment is preferably the internal radius on the upper inner edge of the tower segment.

A plurality of connector elements are preferably all at the same spacing in the radial direction from the longitudinal axis.

The spacing of the connector element from the longitudinal axis in the radial direction is preferably at least or at most 75%, 80%, 85%, 90%, 95% or 97.5% of the internal radius of the tower segment. The spacing of the connector element from the longitudinal axis in the radial direction preferably takes into consideration a welded seam which is possibly present or is to be attached, and/or is preferably 10-30 mm, in particular approximately 20 mm.

It is provided in a further preferred embodiment of the annular bracket that the spacing of the bearing element from the longitudinal axis in the radial direction is smaller than or equal to an external radius of the tower segment, and/or is greater than an internal radius of the tower segment.

Said embodiment advantageously makes it possible for the tensioning force to be introduced via the bearing element into the tower segment. In one preferred variant of said embodiment, the bearing element is arranged at a spacing from the longitudinal axis in such a way that the bearing element is arranged in the outer half, and, in particular, preferably in the outer third, of the wall thickness of the tower segment.

The external radius of the tower segment is preferably the external radius on the upper outer edge of the tower segment.

The spacing of the connector element from the longitudinal axis in the radial direction is preferably at least or at most 90%, 95% or 97.5% of the external radius of the tower segment. The spacing of the connector element from the longitudinal axis in the radial direction preferably takes into consideration a welded seam which is possibly present or is to be attached, and/or is preferably 10-30 mm, in particular approximately 20 mm.

It is provided in a further preferred embodiment of the annular bracket that the annular force transmission element has an upper belt and/or a lower belt.

The upper and/or lower belt are/is configured, possibly with further elements of the force transmission element, to transmit a tensioning force from the connector element to the bearing element. The connector element is preferably arranged on the upper belt, in particular on an inner upper side of the upper belt. The bearing element is preferably arranged on the lower belt, in particular on a lower outer side of the lower belt. Furthermore, the upper belt and lower belt are preferably arranged coaxially with respect to one another and, in particular, are arranged coaxially with respect to the longitudinal axis of the annular bracket. The lower belt preferably has a greater or smaller external diameter and/or a greater or smaller internal diameter than the upper belt.

It is provided in a further preferred embodiment of the annular bracket that the annular force transmission element has an inner web and/or an outer web.

The inner and/or outer web are/is configured, possibly with further elements of the force transmission element, to transmit a tensioning force from the connector element to the bearing element. The connector element is preferably arranged on the inner web, in particular on an inner upper side of the inner web. The bearing element is preferably arranged on the outer web, in particular on a lower outer side of the outer web.

One advantage of this is that a light and at the same time torsionally rigid annular bracket for the external tensioning of a hybrid tower can be produced and assembled with low complexity by way of the inner web and/or the outer web and/or the upper belt and/or the lower belt.

The inner web is preferably arranged in the radial direction within the outer web. Furthermore, the inner and outer web are preferably arranged coaxially with respect to one another and, in particular, are arranged coaxially with respect to the longitudinal axis of the annular bracket. The outer web preferably has a greater external diameter and/or a greater internal diameter than the inner web.

It is provided in a further preferred embodiment of the annular bracket that the connector element is arranged on the upper belt and/or on the inner web and/or on the outer web.

The connector element is preferably arranged at an inner end of the upper belt and/or at an upper end of the inner web. The bearing element is preferably arranged at a lower end of the inner web and/or at a lower end of the outer web and/or at an outer end of the lower belt.

The upper belt and/or lower belt and/or inner web and/or outer web and/or the bearing element and/or the connector element are preferably connected to one another in an integrally joined manner, in particular are welded and/or adhesively bonded, and/or in a non-positive manner, in particular are screwed, and/or in a positively locking manner, in particular in the form of a plug-in connection. The upper belt and/or lower belt and/or inner web and/or outer web and/or the bearing element and/or the connector element can also be of integral configuration.

It is provided in a further preferred embodiment of the annular bracket that the bearing element is configured as an extension of the outer web and/or of the lower outer end of the inner web.

The bearing element is preferably configured as a projection of the outer web, which projection protrudes downward beyond the lower belt. Furthermore, the bearing element is preferably configured as a projection of the inner web, which projection protrudes downward beyond the lower belt and/or protrudes outward in the radial direction beyond the outer web. Furthermore, the projection of the outer web and/or the inner web can preferably be continued in an angled-away manner.

The projection is preferably connected in an integrally joined manner to the outer web and/or the inner web and/or the lower belt. Furthermore, the projection is preferably an integral constituent part of the outer web and/or the inner web and/or the lower belt.

It is provided in a further preferred embodiment of the annular bracket that the inner web and/or the outer web and/or the upper belt and/or the lower belt and/or the bearing element have/has a flat extent in a plane of extent. In the case of a flat extent, the dimensions of the respective element in the plane of extent are multiple times greater than in a direction orthogonally with respect thereto. The plane of extent can be of planar, that is to say non-curved, configuration. The plane of extent can also be curved in one or more directions and can preferably have a curvature radius.

For example, the plane of extent of the bearing element can be curved, in particular with a curvature radius which corresponds substantially to the external radius of the annular bracket and/or in an orientation in the circumferential direction. The inner web and/or the outer web preferably also have/has curved planes of extent which can be arranged coaxially with respect to one another. The planes of extent of the bearing element and/or the inner web and/or the outer web can run substantially parallel to the longitudinal axis or can be inclined with respect to the latter.

The upper belt and/or the lower belt preferably have/has a planar plane of extent which is preferably oriented horizontally or can be inclined with respect to the horizontal. The planes of extent of the upper belt and the lower belt are preferably arranged substantially parallel to one another or at an angle with respect to one another.

It can also be preferred for a plurality of inner webs and/or a plurality of outer webs to be provided. Here, furthermore, it can be preferred that the planes of extent of the plurality of inner webs and/or the plurality of outer webs extend in planes which are defined in each case by the longitudinal axis and a radius. A plurality of inner webs and/or a plurality of outer webs are preferably spaced apart from one another, in particular are arranged equidistantly and/or distributed in the circumferential direction. The webs have the advantage, inter alia, of improving the load introduction and/or preventing buckling of the belts. The number of webs is preferably selected in a manner which is dependent on the tensioning elements, in particular the number and/or spacing thereof.

Furthermore, the plane of extent of the upper belt and/or the lower belt and/or the inner web and/or the outer web is preferably inclined downward or upward from a respective radially inner end to a respective radially outer end.

Furthermore, the plane of extent of the inner web and/or the plane of extent of the outer web are/is preferably arranged orthogonally with respect to the plane of extent of the upper belt and/or with respect to the plane of extent of the lower belt.

In particular, the respective planes of extent of the upper belt and/or the lower belt and/or the inner web and/or the outer web and/or the bearing element are arranged inclined with respect to one another and/or with respect to a horizontal and/or with respect to the longitudinal axis by at least or at most 0°, 5°, 10°, 15°, 20°, 30°, 40°, 45°, 60° or 90°.

A first direction which lies within the plane of extent and in which the extent of an element is multiple times greater than in a second direction within the plane of extent, which direction is, in particular, orthogonal with respect to the first direction, can also be called a main direction of extent of the element.

The upper belt and/or the lower belt and/or the bearing element preferably have/has a main direction of extent in the circumferential direction. An extent of the upper belt and/or the lower belt and/or the bearing element in the plane of extent in the main direction of extent is preferably multiple times greater than an extent of the upper belt and/or the lower belt and/or the bearing element in the plane of extent orthogonally with respect to the main direction of extent, in particular in the radial direction.

The inner web and/or the outer web can have a main direction of extent in the circumferential direction, in particular when an annular inner web and/or an annular outer web are/is provided. An extent of the inner web and/or the outer web in the plane of extent in the main direction of extent is preferably multiple times greater than an extent of the inner web and/or the outer web in the plane of extent orthogonally with respect to the main direction of extent, in particular in the direction of the longitudinal axis.

In the following text, a plurality of further preferred embodiments will be described which, in particular, relate to the arrangement of the inner web and/or the outer web in relation to the upper belt and/or lower belt.

The inner web preferably extends from an inner end of the upper belt to an inner end of the lower belt. The inner web can also extend from an inner end of the upper belt to an outer end of the lower belt. It is preferred, furthermore, that the inner web extends from an outer end of the upper belt to an inner end of the lower belt.

The outer web preferably extends from an outer end of the upper belt to an outer end of the lower belt. The outer web can also extend from an outer end of the upper belt to an inner end of the lower belt. It is preferred, furthermore, that the outer web extends from an inner end of the upper belt to an outer end of the lower belt.

It is provided in a further preferred embodiment of the annular bracket that the inner web and/or the outer web and/or the upper belt and/or the lower belt and/or the bearing element have/has a framework structure with one or more recesses.

Framework structures comprise one or more recesses, the recesses being, for example, circular, oval or polygonal, in particular triangular, rectangular or multi-sided, it being possible for the corners to be rounded. The framework structures are preferably arranged in the planes of extent of the inner web and/or the outer web and/or the lower belt and/or the upper belt in such a way that the tensioning force which is induced from the tensioning element can be transmitted from the connector element to the bearing element. Furthermore, the recesses of the framework structure in the plane of extent of the web and/or the outer web and/or the lower belt and/or the upper belt and/or the bearing element are preferably arranged in sections of the planes of extent with a low flow of force. Recesses are preferably not arranged in the region of the introduction of force and the output of force.

A further advantage of this is that flat extents, configured with the framework structure, of the planes of extent of the inner web and/or the outer web and/or the upper belt and/or the lower belt and/or the bearing element can save material and weight and can therefore ultimately reduce costs. Furthermore, the said framework structure advantageously facilitates both the transport and the assembly of the annular bracket.

It is provided in a further preferred embodiment of the annular bracket that the inner web and/or the outer web and/or the upper belt and/or the lower belt have/has a through opening for leading through the tensioning element.

A through opening for leading through the tensioning element is preferably arranged at a spacing from the longitudinal axis in such a way that the tensioning element can be guided spaced apart from or adjacently with respect to a tower segment, and, in particular, does not have to be guided through the tower segment. Furthermore, the through opening for leading through the tensioning element is preferably arranged at a spacing from the longitudinal axis in such a way that the tensioning element can be guided and arranged in the tower interior.

The through opening for leading through the tensioning element is preferably arranged at a spacing from the longitudinal axis of at least the radius of the inner end of the inner and/or outer web and at most with the radius of the inner edge of the upper and/or lower tower segment.

It is provided in a further preferred embodiment of the annular bracket that the annular force transmission element comprises a bracket thrust latch arrangement for engaging into an upper and/or lower tower segment thrust latch arrangement.

The bracket thrust latch arrangement is preferably arranged substantially parallel to the longitudinal axis and/or is configured, in engagement with an upper and/or lower tower segment thrust latch arrangement, to absorb forces which act radially and/or tangentially. As a result, radial and/or tangential relative movements between the annular bracket and/or a lower tower segment and/or an upper tower segment are preferably prevented or reduced.

The bracket thrust latch arrangement preferably comprises a thrust latch recess and/or a thrust latch projection. The bracket thrust latch arrangement is preferably configured to enter into a positively locking and/or non-positive and/or integrally joined connection in engagement with the upper and/or lower tower segment thrust latch arrangement. In particular, the bracket thrust latch arrangement is configured to enter into a releasable or non-releasable connection in engagement with the upper and/or lower tower segment thrust latch arrangement.

A thrust latch projection is preferably configured as a cylindrical and/or conical projection, particularly preferably comprising a pin, mandrel or cam. Furthermore, the thrust latch projection is preferably configured to be received by a thrust latch recess of the tower segment thrust latch arrangement. Furthermore, a thrust latch recess of the bracket thrust latch arrangement is preferably configured to receive a thrust latch projection of the tower segment thrust latch arrangement, preferably to receive pins, mandrels or cams. The bracket thrust latch arrangement can also be configured as a wave profile and/or toothed profile, it being possible, for example, for the toothed profile to comprise triangular or rectangular teeth.

Furthermore, the bracket thrust latch arrangement preferably comprises a plurality of thrust latch projections and/or thrust latch recesses which are preferably arranged equidistantly and/or distributed in the circumferential direction. The number of thrust latch projections and/or thrust latch recesses is preferably selected in a manner which is dependent on the tensioning elements, in particular the number and/or spacing thereof.

The bracket thrust latch arrangement is preferably arranged at a spacing from the longitudinal axis which is less than or equal to an external radius of the tower segment and/or is greater than or equal to the internal radius of the tower segment.

It is provided in a further preferred embodiment of the annular bracket that the force transmission element is of integral configuration or has a plurality of bracket segments.

The force transmission element for the transmission of the tensioning force from a connector element to a bearing element can be of integral configuration.

The force transmission element for the transmission of the tensioning force from a connector element to a bearing element can also, however, have a plurality of bracket segments which are in each case preferably of ring segment-shaped configuration. This makes simple and rapid transport and comparatively simple and also retrospective assembly possible, for example, by way of the provision of the bracket segments through a tower door.

The bracket segments can be connected to one another to form an annular bracket. The connection can be of releasable or non-releasable configuration. The connection can be realized in a non-positive manner, for example, as a screw connection, and/or in an integrally joined manner, for example, as a welded connection, and/or as a positively locking connection.

It is provided in a further preferred embodiment of the annular bracket that the bracket segments on at least one end side in the circumferential direction have a connecting arrangement for the connection of the bracket segments among one another.

The bracket segments are preferably connected to form an annular bracket by means of the connecting arrangement exhibited on at least one end side in the circumferential direction. The connecting arrangement can be arranged substantially orthogonally with respect to a circumferential direction. The connecting arrangement preferably comprises a first and/or a second fastening element, it being possible for the first and/or the second fastening element to be configured as bolts and/or rivets and/or screws. In particular, the connecting arrangement comprises a pressure pad as first fastening element and a shearing perforation connection as second fastening element.

The bracket segments preferably have interfaces, via which they can be connected to one another to form an annular bracket. The interfaces can be arranged substantially orthogonally with respect to a circumferential direction.

It is provided in a further preferred embodiment of the annular bracket that the annular bracket, in particular the inner web and/or the outer web and/or the upper belt and/or the lower belt and/or the connector element and/or the bearing element and/or the bracket thrust latch arrangement, consists of steel, preferably structural steel, or of cast iron or of concrete, preferably reinforced concrete or prestressed concrete. The annular bracket, in particular the inner web and/or the outer web and/or the upper belt and/or the lower belt and/or the connector element and/or the bearing element and/or the bracket thrust latch arrangement, can also comprise steel, preferably structural steel, and/or cast iron and/or concrete, preferably reinforced concrete or prestressed concrete.

In accordance with a further aspect of the invention, an external tensioning system of a hybrid tower, preferably a hybrid tower of a wind power plant, comprising an above-described annular bracket, a tensioning element with a connector head at one end for the transmission of a tensioning force to the connector element, and a brace at a second end for the transmission of the tensioning force to a lower tower segment.

The connector head of the tensioning element is preferably configured to be connected to the connector element of the annular bracket. The connection can be of releasable or non-releasable configuration. In particular, the connection can be of non-positive and/or positively locking and/or integrally joined configuration. Furthermore, the brace is preferably configured for fastening to a tower segment, in particular to a lower tower segment, it being possible for the fastening to preferably be of releasable or non-releasable configuration. In particular, the connection can be of non-positive and/or positively locking and/or integrally joined configuration.

In accordance with a further aspect of the invention, a tower section of a hybrid tower, preferably a hybrid tower of a wind power plant, comprising an upper tower segment with a radially inwardly directed shoulder, an annular bracket of an above-described external tensioning system, which annular bracket is arranged on the shoulder in the interior of the upper tower segment, and a lower tower segment which is arranged below the upper tower segment and on which a tensioning element is arranged by means of a brace of the external tensioning system.

The annular bracket preferably transmits the tensioning forces which are introduced on the connector element via the bearing element to the radially inwardly directed shoulder of the upper tower segment and to the lower tower segment. The tensioning element is preferably fastened by way of the brace to the lower tower segment and/or tower section for the external tensioning of the lower tower segment and/or tower section. The brace is preferably fastened releasably, for example, by means of a screw connection, to the lower tower segment and/or tower section for the external tensioning of the lower tower segment and/or tower section.

The radially inwardly directed shoulder of the upper tower segment preferably has an identical external radius to the external radius of the upper outer edge of a lower tower segment which is arranged directly below it and/or an identical internal radius to the internal radius of the upper inner edge of a lower tower segment which is arranged directly below it.

It is provided in a further preferred embodiment of the tower section of a hybrid tower that at least one further tower segment is arranged between the upper tower segment and the lower tower segment which is provided with the brace.

In one preferred variant of said embodiment, at least one further tower segment is arranged between the upper tower segment and the lower tower segment which is connected to the brace. In this way, the tower segments which are arranged between the upper tower segment and the lower tower segment which is connected to the brace can be prestressed by means of the external tensioning system.

It is provided in a further preferred embodiment of the tower section of a hybrid tower that the lower tower segment which is provided with the brace is the lowermost tower segment which is preferably configured for the connection to a tower foundation.

In one preferred variant of said embodiment, the lower tower segment which is connected to the brace is the lowermost tower segment which is fastened to the tower foundation.

It is provided in a further preferred embodiment of the tower section of a hybrid tower that the upper tower segment comprises an upper tower segment thrust latch arrangement, and/or the lower tower segment comprises a lower tower segment thrust latch arrangement, the upper tower segment thrust latch arrangement being configured for engaging into a bracket thrust latch arrangement and/or for engaging into the lower tower segment thrust latch arrangement, and/or the lower tower segment thrust latch arrangement being configured for engaging into a bracket thrust latch arrangement and/or for engaging into the upper tower segment thrust latch arrangement.

The upper tower segment thrust latch arrangement is preferably configured, in engagement with the lower tower segment thrust latch arrangement and/or with the bracket thrust latch arrangement, to receive forces which act radially and tangentially, in such a way that radial and/or tangential relative movements between the annular bracket and/or a lower tower segment and/or an upper tower segment are prevented.

The lower tower segment thrust latch arrangement is preferably configured, in engagement with the upper tower segment thrust latch arrangement and/or with the bracket thrust latch arrangement, to receive forces which act radially and/or tangentially. As a result, radial and/or tangential relative movements between the annular bracket and/or a lower tower segment and/or an upper tower segment can preferably be prevented or reduced.

The upper tower segment thrust latch arrangement and/or the lower tower segment thrust latch arrangement preferably comprise/comprises a thrust latch recess and/or a thrust latch projection. The lower tower segment thrust latch arrangement can preferably be brought in a positively locking and/or non-positive and/or integrally joined manner into engagement with the bracket thrust latch arrangement and/or can be connected to the upper tower segment thrust latch arrangement. The upper tower segment thrust latch arrangement can preferably be brought in a positively locking and/or non-positive and/or integrally joined manner into engagement with the bracket thrust latch arrangement and/or with the lower tower segment thrust latch arrangement.

The upper tower segment thrust latch arrangement and/or the lower tower segment thrust latch arrangement are/is preferably configured as a wave profile and/or toothed profile, it being possible for the toothed profile to comprise, for example, triangular or rectangular teeth.

In accordance with a further aspect of the invention, a hybrid tower, preferably a hybrid tower for a wind power plant, comprising an above-described tower section.

In accordance with a further aspect of the invention, a wind power plant comprising an above-described hybrid tower.

In accordance with a further aspect of the invention, an assembly method of an external tensioning system for a hybrid tower, preferably for a hybrid tower of a wind power plant, comprising providing of an above-described external tensioning system, assembling of the external tensioning system, arranging of an annular bracket with a bearing element of the external tensioning system on a shoulder in the interior of an upper tower segment, and/or fastening of the annular bracket with the bearing element of the external tensioning system on the shoulder in the interior of the upper tower segment, arranging of a tensioning element with a connector head of the external tensioning system on a connector element of the annular bracket, and/or fastening of the tensioning element with the connector head of the external tensioning system to the connector element of the annular bracket, arranging of the tensioning element by means of a brace of the external tensioning system on a lower tower segment, and/or fastening of the tensioning element by means of the brace of the external tensioning system on the lower tower segment.

The assembly method of the external tensioning system for a hybrid tower is preferably suitable both for initial assembly and for the retrofitting of existing hybrid towers, that is to say for retrospective assembly. The assembling of the external tensioning system comprises, in particular in the case of an annular bracket which comprises a plurality of bracket segments, the assembling of the bracket segments to form the annular bracket. In a particularly preferred way, the assembly method of the external tensioning system comprises the assembling of the bracket segments in the tower interior.

In respect of the advantages, design variants and design details of said further aspects of the invention and their respective developments, reference is made to the preceding description in respect of the corresponding features of the remaining aspects.

BRIEF DESCRIPTION OF THE SEVERAL VIEWS OF THE DRAWINGS

Preferred embodiments of the invention will be described by way of example on the basis of the appended figures, in which.

DETAILED DESCRIPTION

In the figures, identical or substantially functionally identical or functionally similar elements are denoted by way of the same designations.

Figure 1:
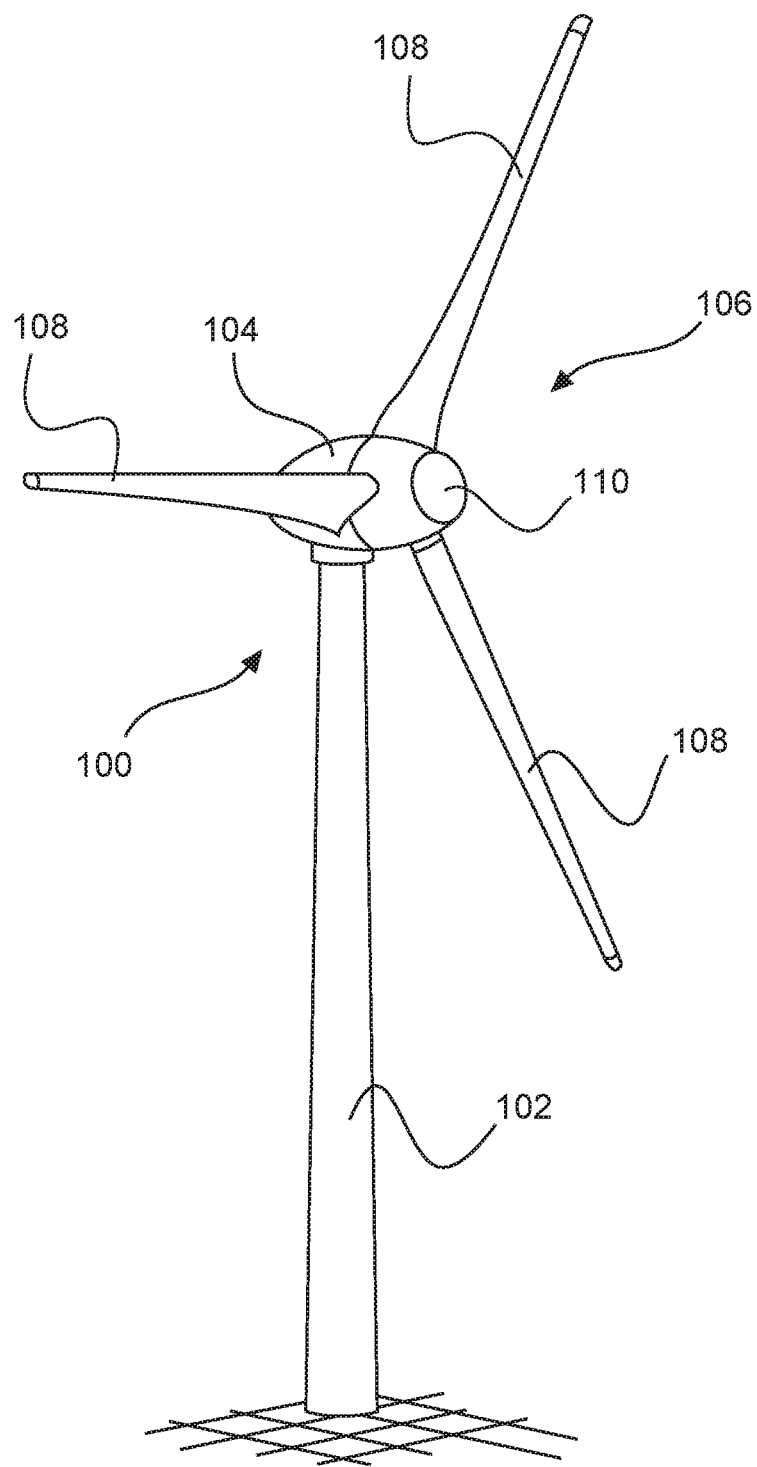
FIG. 1 shows a diagrammatic, three-dimensional view of one exemplary embodiment of a wind power plant.

FIG. 1 shows a diagrammatic, three-dimensional view of a wind power plant in accordance with the invention. The wind power plant 100 has a tower 102 and a nacelle 104 on the tower 102. An aerodynamic rotor 106 with three rotor blades 108 and a spinner 110 is provided on the nacelle 104. During operation of the wind power plant, the aerodynamic rotor 106 is set in a rotational movement by way of the wind and therefore also drives an electrodynamic rotor or runner of a generator which is connected directly or indirectly to the aerodynamic rotor 106. The electric generator is arranged in the nacelle 104 and generates electric energy. The pitch angles of the rotor blades 108 can be changed by way of pitch motors on the rotor blade roots 108b of the respective rotor blades 108. The tower 102 of the wind power plant 100 has an annular bracket as part of an external tensioning system as described herein.

Figure 2:
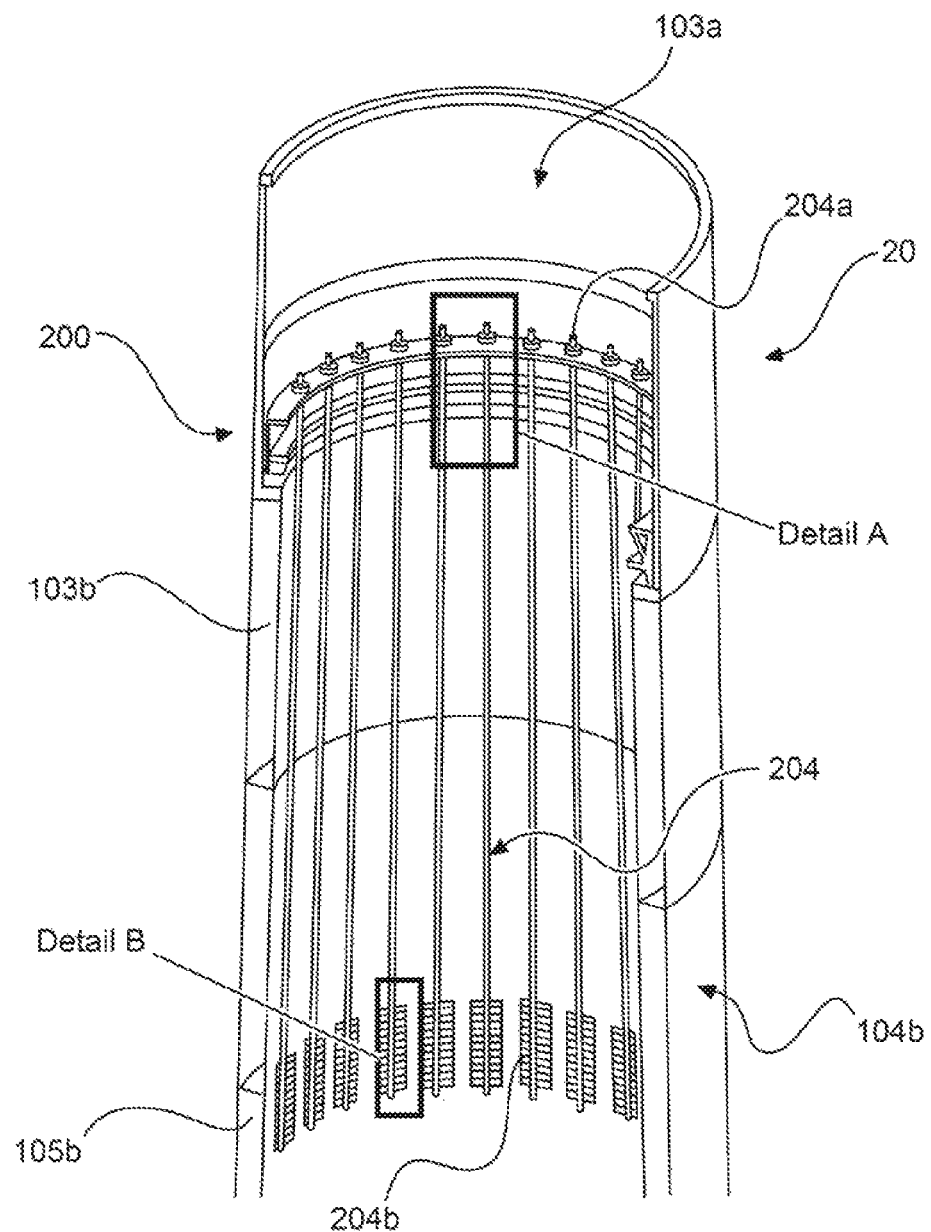
FIG. 2 shows a three-dimensional sectioned view of an external tensioning system which is attached in a hybrid tower.
Figure 3:
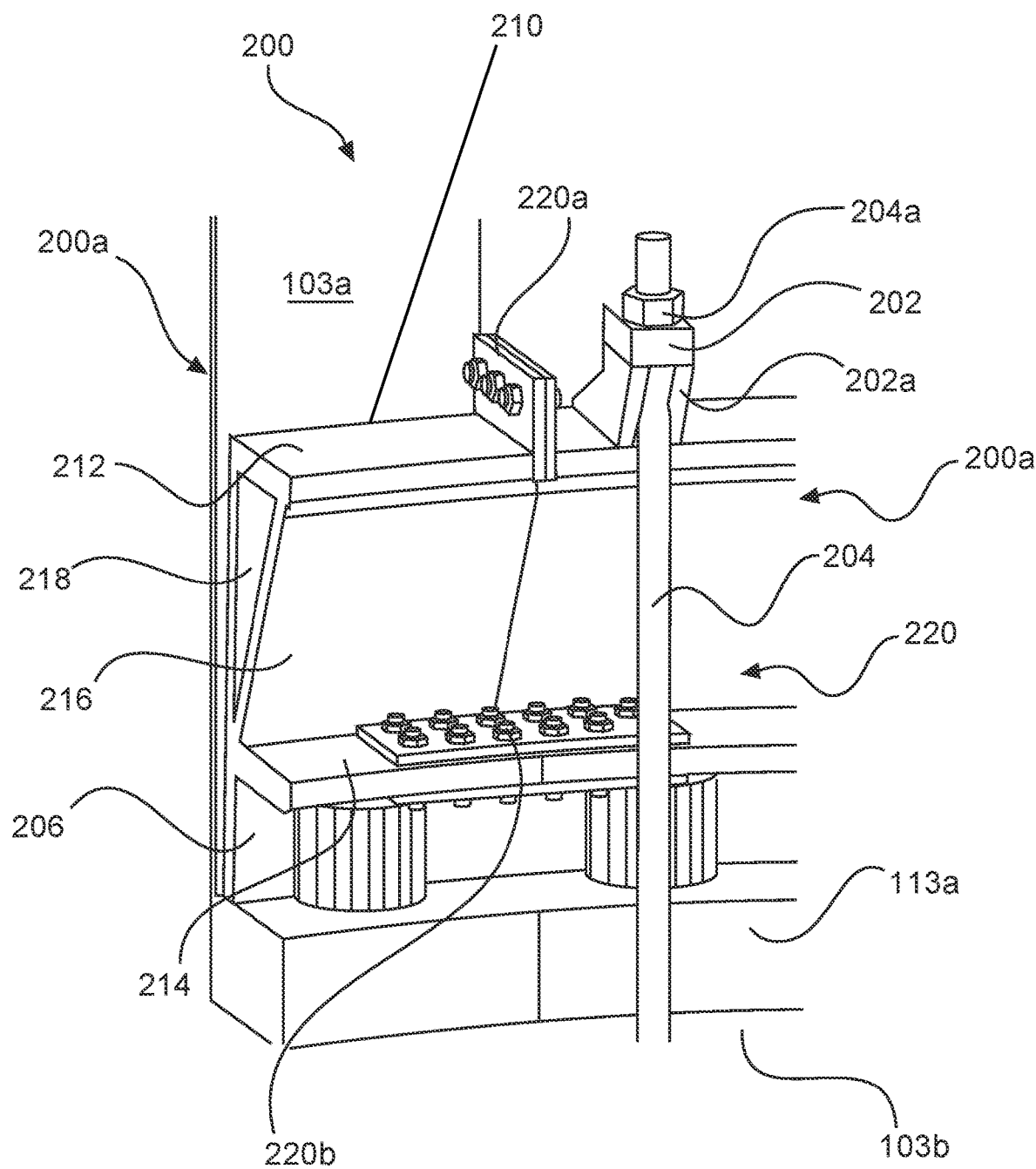

FIG. 2 shows a tower section of a tower with an upper tower segment 103a and a plurality of lower tower segments 103b, 104b, 105b which are arranged below it in the longitudinal direction and are braced substantially in the longitudinal direction by way of an external tensioning system 20. The external tensioning system 20 has an annular bracket 200 which is shown in yet greater detail in FIGS. 3 and 4. There are tensioning elements 204 with connector heads 204a at a first end for the transmission of a transmission force to the annular bracket 200 and a brace 204b for the transmission of the tensioning force to a lower tower segment (here, the tower segment 105b) on the annular bracket 200.

Figure 3:
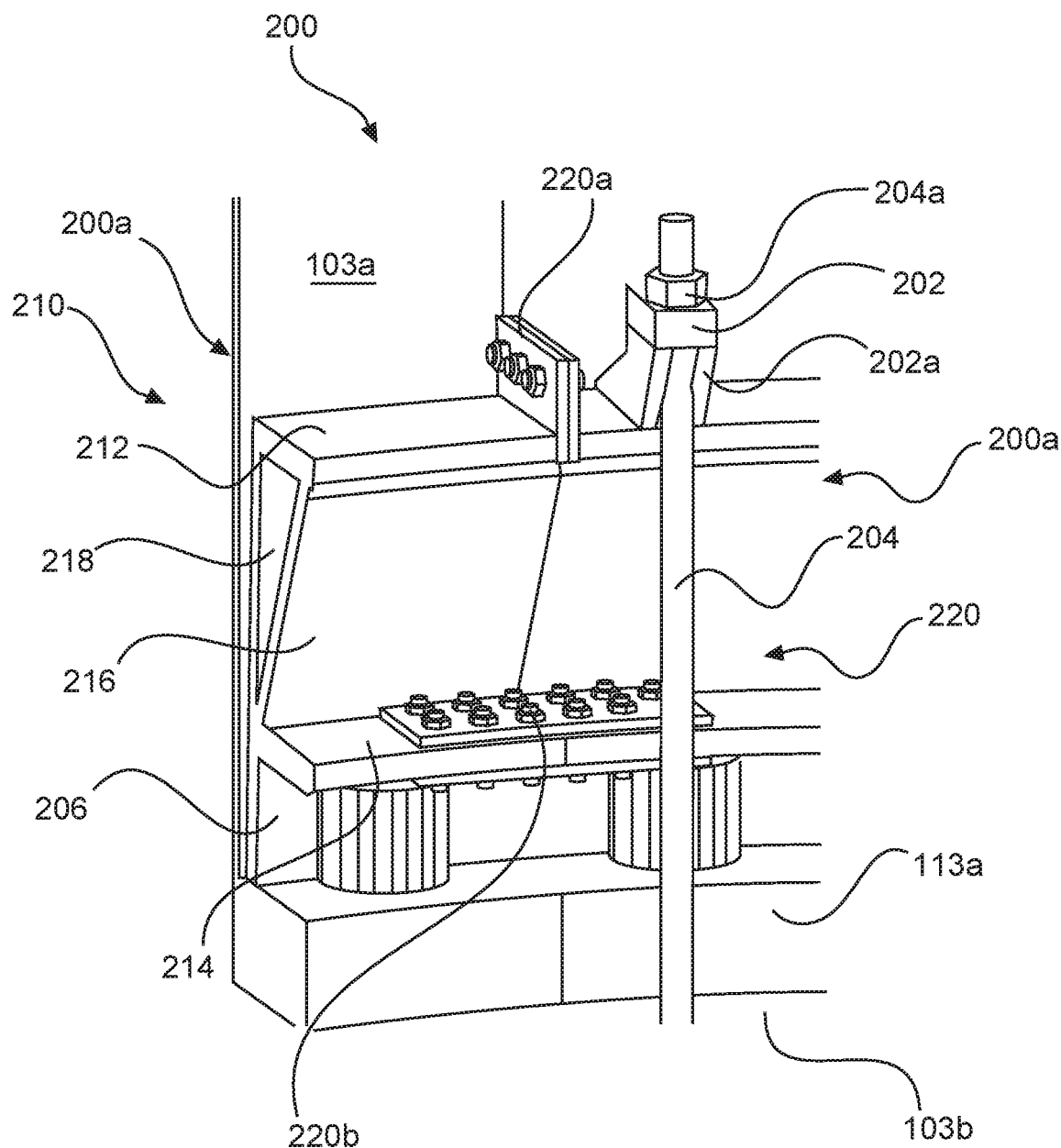
FIG. 3 shows a three-dimensional view of a part of the annular bracket of the external tensioning system according to FIG. 2.
Figure 4:
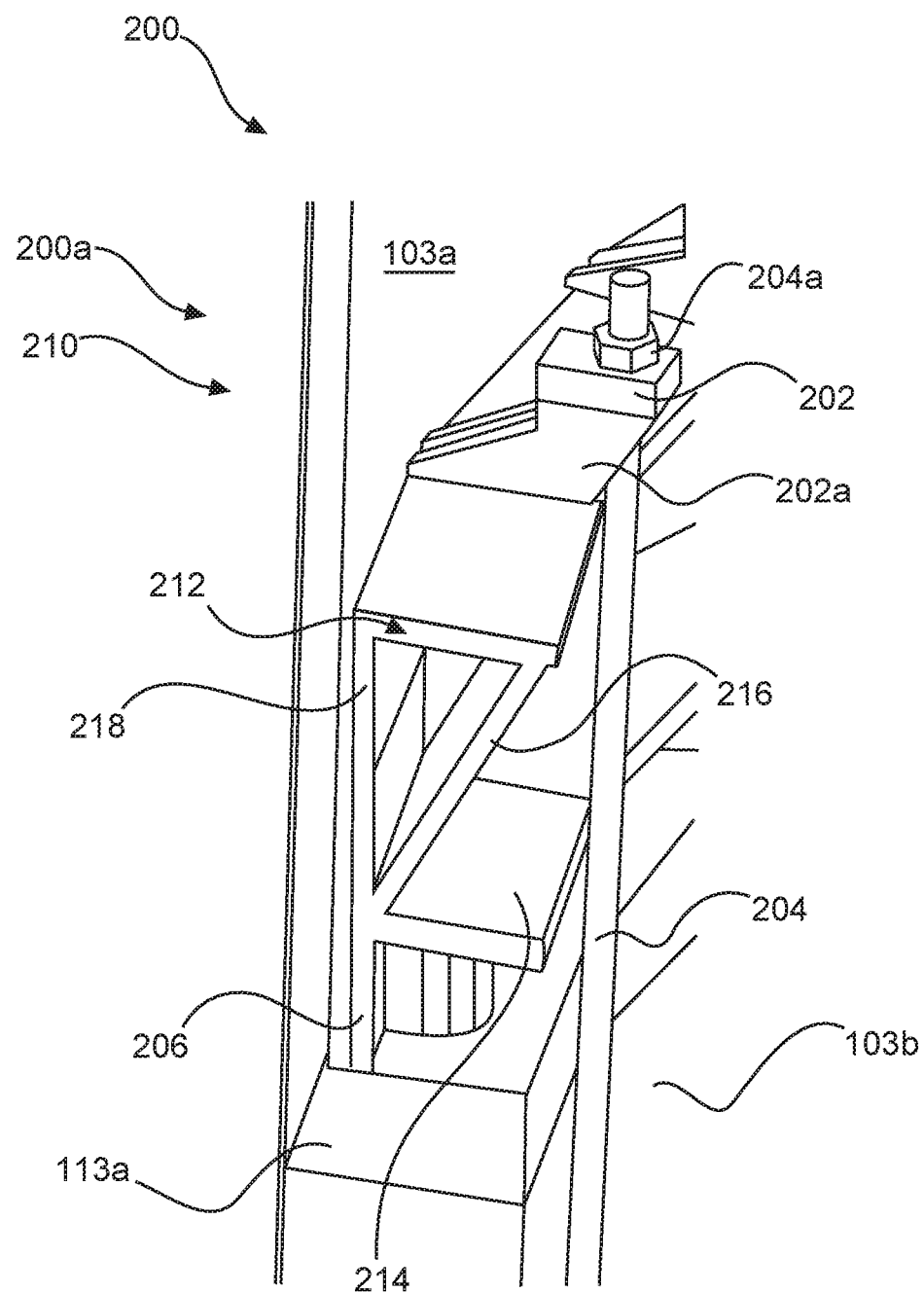
FIG. 4 shows a further three-dimensional view of a part of the annular bracket of the external tensioning system according to FIG. 2 (detail A)

As can also be seen more precisely in FIGS. 3 and 4, the annular bracket 200 of the external tensioning system 20 is arranged and/or fastened on the upper side of an inwardly directed shoulder 113a of the upper tower segment 103a. By way of the underside of the inwardly directed shoulder 113a of the upper tower segment 103a, the upper tower segment 103a is arranged on the lower tower segment 103b. In the design variant which is shown in FIG. 2, the third lower tower segment 105b which is arranged below the upper tower segment 103a is connected via the brace 204b to the tensioning elements 204, and thus prestresses the further tower segments 103b, 104b. The upper tower segment 103a is configured from steel. The lower tower segments 103b, 104b, 105b comprise concrete, preferably prestressed concrete and/or reinforced concrete.

Figure 5:
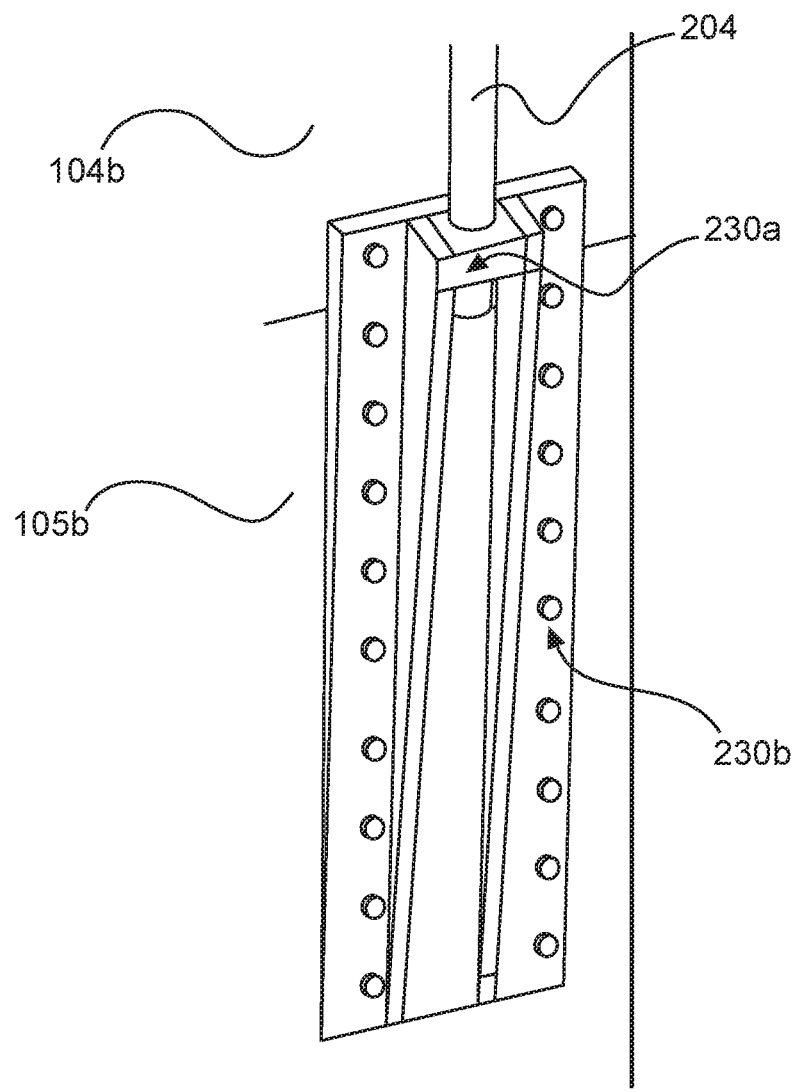
FIG. 5 shows a three-dimensional view of a brace of the external tensioning system according to FIG. 2 (detail B)

At the first, upper end, the tensioning elements 204 are connected via connector heads 204a to connector elements 202 of the external tensioning system 20. A connector head 204a of a tensioning element 204 comprises, for example, a screw connection consisting of a threaded rod and a nut. At the second, lower end, the tensioning elements 204 are connected via braces 204b to the lower tower segment 105b or its inner wall, as can also be seen, in particular, in FIG. 5. In the case of the design variant which is shown, the tensioning element 204 configures a threaded rod at its lower end in the region of the brace 204b, which threaded rod is screwed to a steel rail 230a, b which is fastened to the inner wall of the tower segment 105b. The steel rail 230a, b is preferably screwed to the tower segment 105b or is fastened, for example, by means of plug-through braces on the tower segment 105b. In addition and/or as an alternative, tensioning elements 204 can be fastened to any desired other lower tower segment and/or the foundation of the tower 102. In the design variant which is shown in FIG. 2, the tensioning elements 204 are arranged substantially parallel to the inner wall of the lower tower segments in the tower interior.

For bracing, the tensioning elements 204 are braced, for example, by means of the nut which is screwed onto the thread and bears on the upper side of the connecting element 202. The tensioning force which prevails in the tensioning element can be set, for example, by means of a torque wrench. Via the connector head 204a and the brace 204b of the tensioning element 204, the tensioning force is conducted into the upper tower segment 103a and the tower segment 105b or the foundation, and braces the lower tower segments 103b, 104b which are arranged in between.

The tensioning elements 204 and respective associated connector elements 202 are arranged equidistantly with respect to one another in the circumferential direction.

Figure 7:
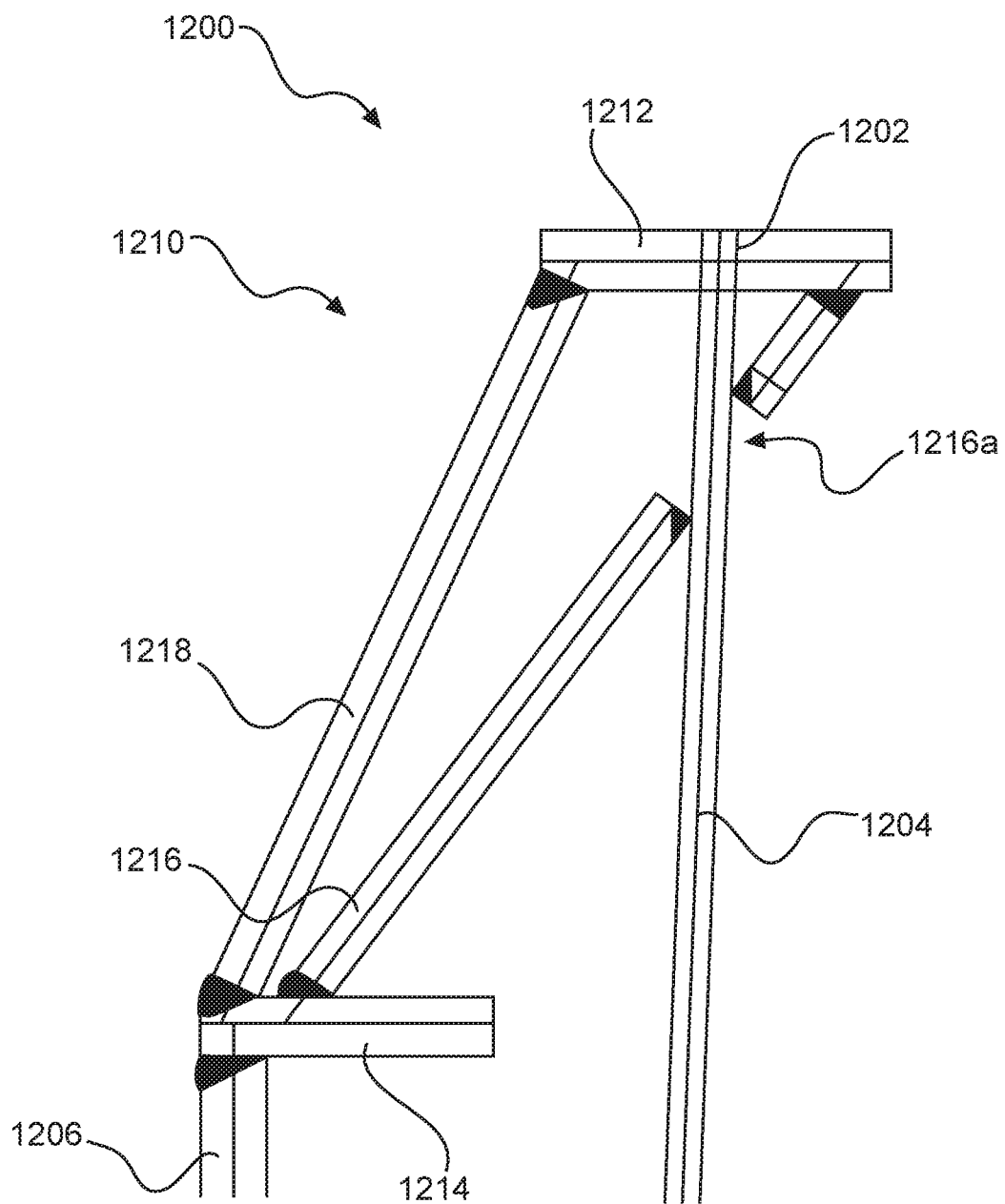
FIG. 7 shows a cross section of a part of a further embodiment of an annular bracket.

As can also be seen, in particular, in FIG. 3, the annular bracket 200 can comprise a plurality of bracket segments 200a. FIG. 7 shows a cross section of a part of a further embodiment of an annular bracket 1200. The two annular brackets 200, 1200 have an annular force transmission element 210, 1210 which comprises an upper belt 212, 1212, a lower belt 214, 1214, an inner web 216, 1216 and an outer web 218, 1218 with a connector element 202, 1202 and a bearing element 206, 1206.

In the two variants of FIGS. 3 and 7, the upper belt 212, 1212 is connected at its inner end to the inner upper end of the inner web 216, 1216. Furthermore, the upper belt 212, 1212 is connected at its outer end to the upper end of the outer web 218, 1218. The inner web 216, 1216 is connected by way of its lower outer end to the lower end of the outer web 218, 1218. In particular, the lower outer end of the inner web 216, 1216 is connected in the region of the lower half of the plane of extent in the longitudinal direction of the outer web 218, 1218. Furthermore, the lower outer end of the inner web 216, 1216 is connected to the outer end of the lower belt 214, 1214. The upper belt 212, 1212 and/or the inner web 216, 1216 and/or the outer web 218, 1218 and/or the lower belt 214, 1214 are preferably connected to one another in an integrally joined manner.

The upper belt 212, 1212, the lower belt 214, 1214, the inner web 216, 1216, the outer web 218, 1218 and the bearing element 206, 1206 in each case have a flat extent in a plane of extent. The upper belt 212, 1212 and the lower belt 214, 1214 have a planar plane of extent which is oriented horizontally. The plane of extent of the upper belt 212, 1212 and that of the lower belt 214, 1214 are substantially parallel.

The planes of extent of the bearing element 206, 1206 and the inner web 216, 1216 and the outer web 218, 1218 are curved in an orientation in the circumferential direction, and are arranged coaxially with respect to one another. The plane of extent of the bearing element 206, 1206 runs substantially parallel to the longitudinal axis.

In FIG. 3, the plane of extent of the outer web 218 also runs substantially parallel to the longitudinal axis, whereas a plane of extent of the inner web 216 runs in an inclined manner with respect to the longitudinal axis. In FIG. 7, the planes of extent of the inner web 1216 and the outer web 1218 run in an inclined manner with respect to the longitudinal axis.

The upper belt 212, 1212 and the lower belt 214, 1214 and the bearing element 206, 1206 have a main direction of extent in the circumferential direction. In FIGS. 3 and 7, the inner web 216, 1216 and the outer web 218, 1218 likewise have a main direction of extent in the circumferential direction, and are configured as annular webs.

The extent of the upper belt 212, 1212 and the lower belt 214, 1214 in the plane of extent in the main direction of extent is multiple times greater than an extent of the upper belt 212, 1212 and the lower belt 214, 1214 in the plane of extent orthogonally with respect to the main direction of extent in the radial direction.

The extent of the bearing element 206, 1206 in the plane of extent in the main direction of extent is multiple times greater than an extent of the bearing element 206, 1206 in the plane of extent orthogonally with respect to the main direction of extent in the longitudinal direction.

In FIGS. 2 and 3, the inner web 216, 1216 extends from an inner end of the upper belt 212, 1212 to an outer end of the lower belt 214, 1214. The outer web 218, 1218 extends from an outer end of the upper belt 212, 1212 to an outer end of the lower belt 214, 1214.

According to FIG. 7, the inner web 1216 has a through opening 1216a for leading through the tensioning element 1204.

According to FIG. 3, the inner web 216 is arranged with an acute angle as inclination angle with respect to the inner wall of the upper tower segment 103a and/or the longitudinal axis. In FIG. 3, the outer web 218 is arranged with its flat extent in a plane of extent substantially parallel to the longitudinal axis, and/or is arranged substantially parallel to the inner wall of the upper tower segment 103a. In FIG. 7, the outer web 1218 is arranged with its flat extent in a plane of extent substantially non-parallel to the longitudinal axis, and/or is arranged substantially non-parallel to the inner wall of the upper tower segment in the installed state.

Furthermore, FIGS. 3 and 7 show a bearing element 206, 1206 which extends substantially in the longitudinal direction and is connected by way of its upper end in the circumferential direction to the outer end of the lower belt 214, 1214. Furthermore, in FIG. 3, a projection of the outer web 218, which projection protrudes downward beyond the lower belt 214 in the longitudinal direction, configures the bearing element 206.

FIG. 3 shows an annular bracket 200 which comprises a plurality of bracket segments 200a for the purpose of transport and/or assembly. The bracket segments 200a are connected to one another by way of a connecting arrangement 220. The connecting arrangement 220 comprises a first fastening element 220a and a second fastening element 220b. The first fastening element 220a is a pressure pad which is arranged in the circumferential direction on the end side on the bracket segment 200a, and configures a flange in the radial direction and in the longitudinal direction. The pressure pad 220a is preferably connected to the upper belt 212, with preference in an integrally joined manner. The second fastening element 220b is preferably a shearing perforation connection which is arranged in the circumferential direction on the bracket segment 200a and extends substantially in the circumferential direction. The shearing perforation connection 220b is preferably connected to the lower belt 214, with preference releasably, for example, by means of a screw connection.

Furthermore, FIG. 3 shows a connector element 202 which, arranged on the upper belt 212 on the upper side thereof, is fastened via a connector piece 220a to the upper belt 212. In the present description, in particular, the connector element 202 is understood to mean the position (such as a through opening) on a possibly larger overall element, at which position the tensioning element is connected.

The connector element 202 is arranged at a spacing from the longitudinal axis in such a way that the spacing is smaller than the internal radius of the upper belt 212 and/or the inner edge of the inwardly directed shoulder 113a of the upper tower segment 103a and/or the inner edge of the lower tower segment 103b.

FIG. 7 shows a connector element 1202 which is arranged on the upper belt 1212 and has a through opening for a tensioning element 1204, which through opening is configured substantially in the longitudinal direction, and which tensioning element 1204 can be arranged and/or fastened by way of its connector head 1204a in the through opening of the connector element 1202. The through opening of the connector element 1202 for the tensioning element 1204 is arranged at a spacing radially from the annular bracket 1200 in such a way that this is smaller than the internal radius of the inner edge of the upper and/or lower tower segment, but lies between the external radius and the internal radius of the upper belt 1212.

The through opening of the inner web 1216 for the tensioning element 1204 is arranged at a spacing radially from the annular bracket 1200 in such a way that it is smaller than the smallest internal radius of the upper and/or lower tower segment, but lies between the external radius and the internal radius of the inner web 1216.

Figure 6:
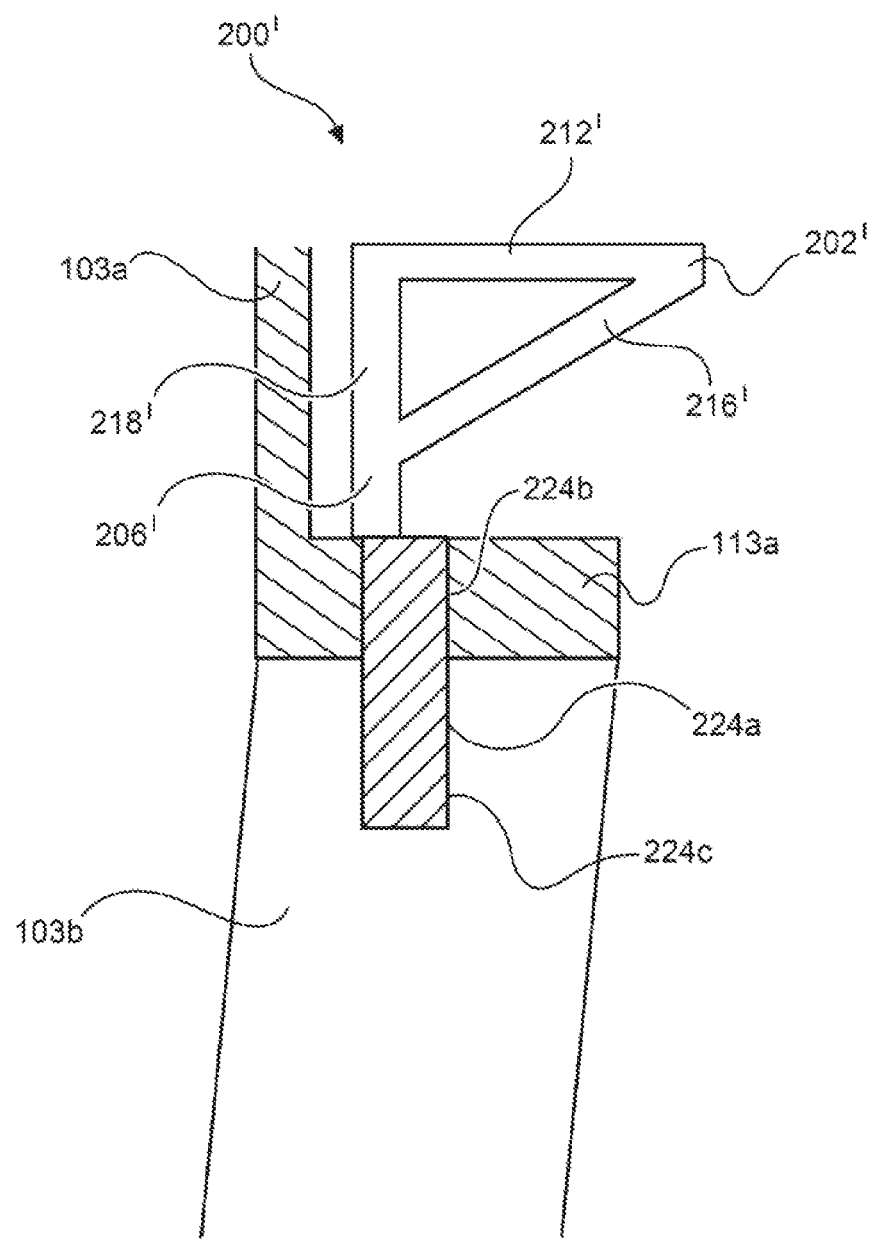
FIG. 6 shows a diagrammatic illustration of one embodiment of an annular bracket with a thrust latch arrangement.

FIG. 6 shows one refinement of one embodiment of an annular bracket 200' which is similar to the annular bracket 200 which is shown in FIGS. 3 and 4. The annular bracket 200' has an upper belt 212', a connector element 202', an outer web 218', an inner web 216' and a bearing element 206'. Unlike the annular bracket 200 which is shown in FIGS. 3 and 4, the annular bracket 200' according to FIG. 6 does not have a lower belt, however. The annular bracket 200' which is shown in FIG. 6 has a thrust latch arrangement, however. Here, the annular bracket 200' configures thrust mandrels 224a as a bracket thrust latch arrangement in the longitudinal direction in the region of the bearing element 206'. The tower segment thrust latch arrangement of the upper tower segment 103a is configured as a through opening 224b, and the tower segment thrust latch arrangement of the lower tower segment 103b is configured as a blind bore 224c, which bore and opening in each case receive the thrust mandrel 224a of the bracket thrust latch arrangement. By means of the thrust latch arrangement, an arrangement of the lower tower segment 103b, the upper tower segment 103a and the annular bracket 200' is insured with a defined angular position with respect to one another. Furthermore, the thrust latch arrangement prevents or reduces relative movements in the radial and/or tangential direction between the lower tower segment 103b and/or the upper tower segment 103a and/or the annular bracket 200'.

Figure 8:
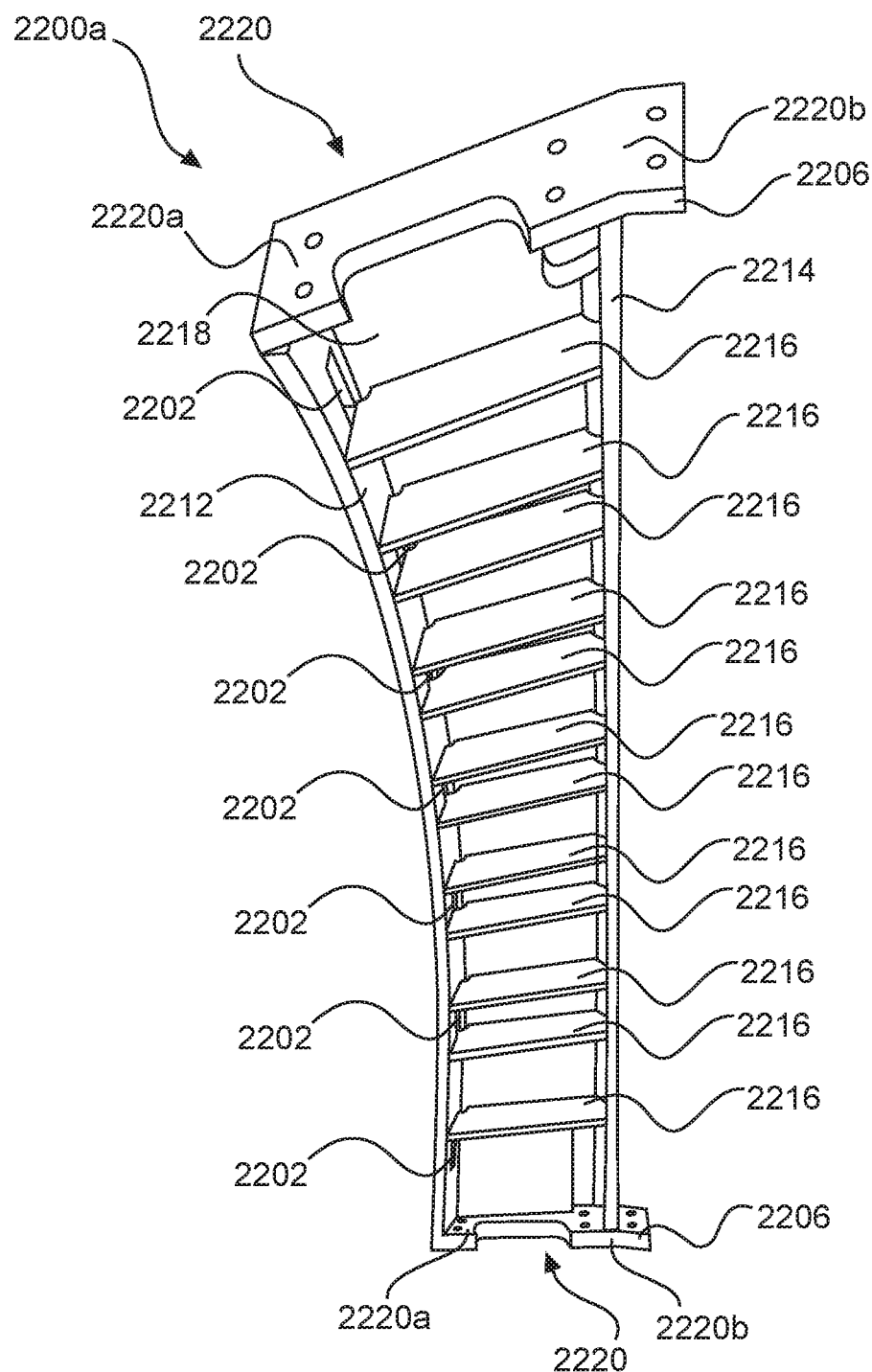
FIG. 8 shows a three-dimensional view of a bracket segment of a further embodiment of an annular bracket.
Figure 9:
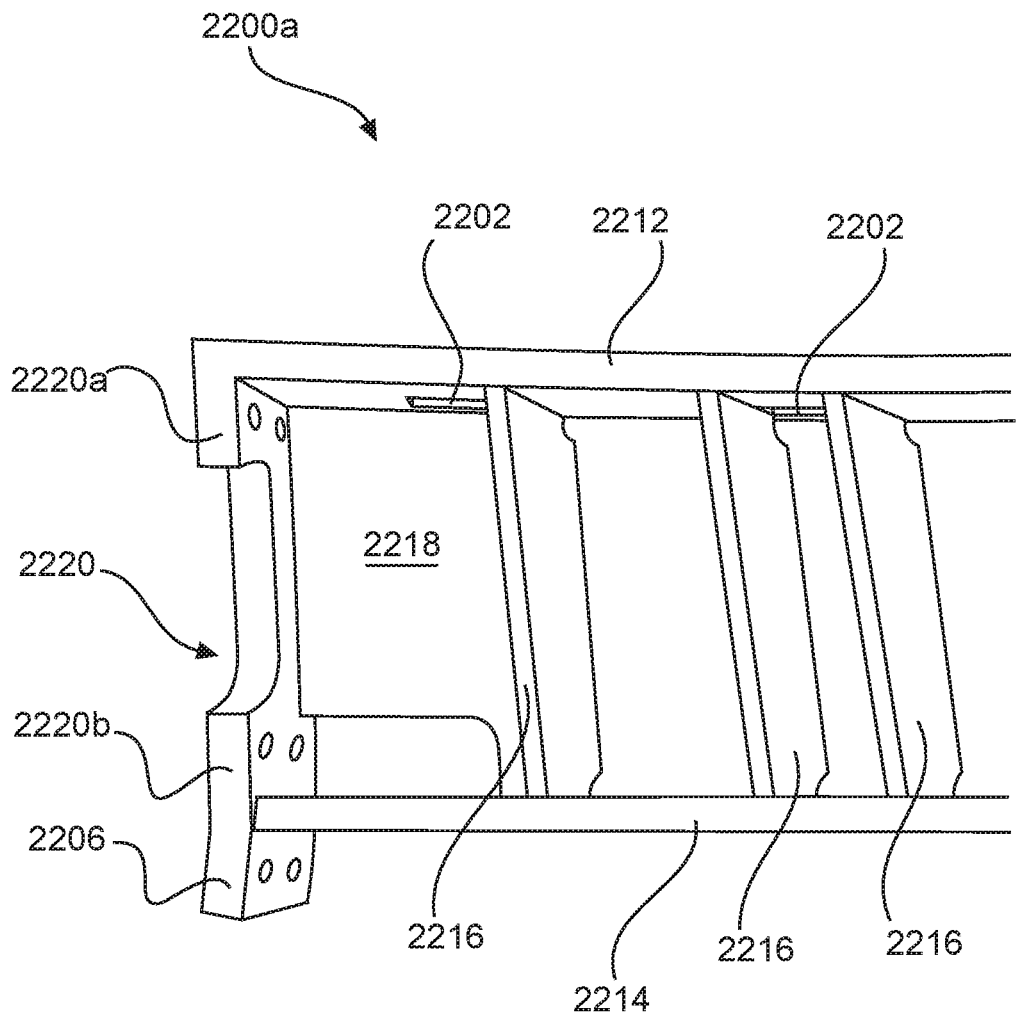
FIG. 9 shows a three-dimensional partial view of the bracket segment according to FIG. 7.
Figure 10:
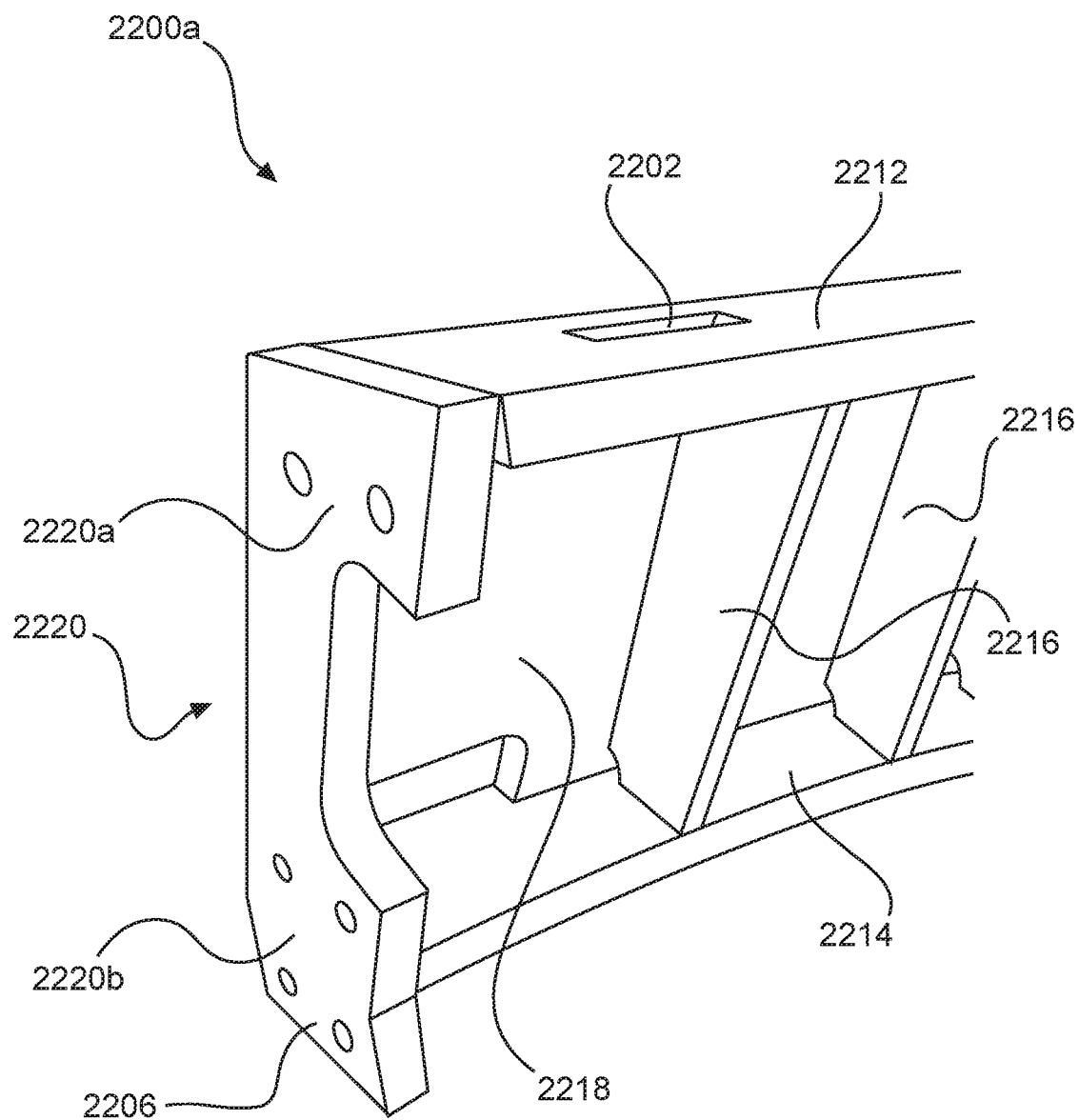
FIG. 10 shows a further three-dimensional partial view of the bracket segment according to FIG. 7.
Figure 11:
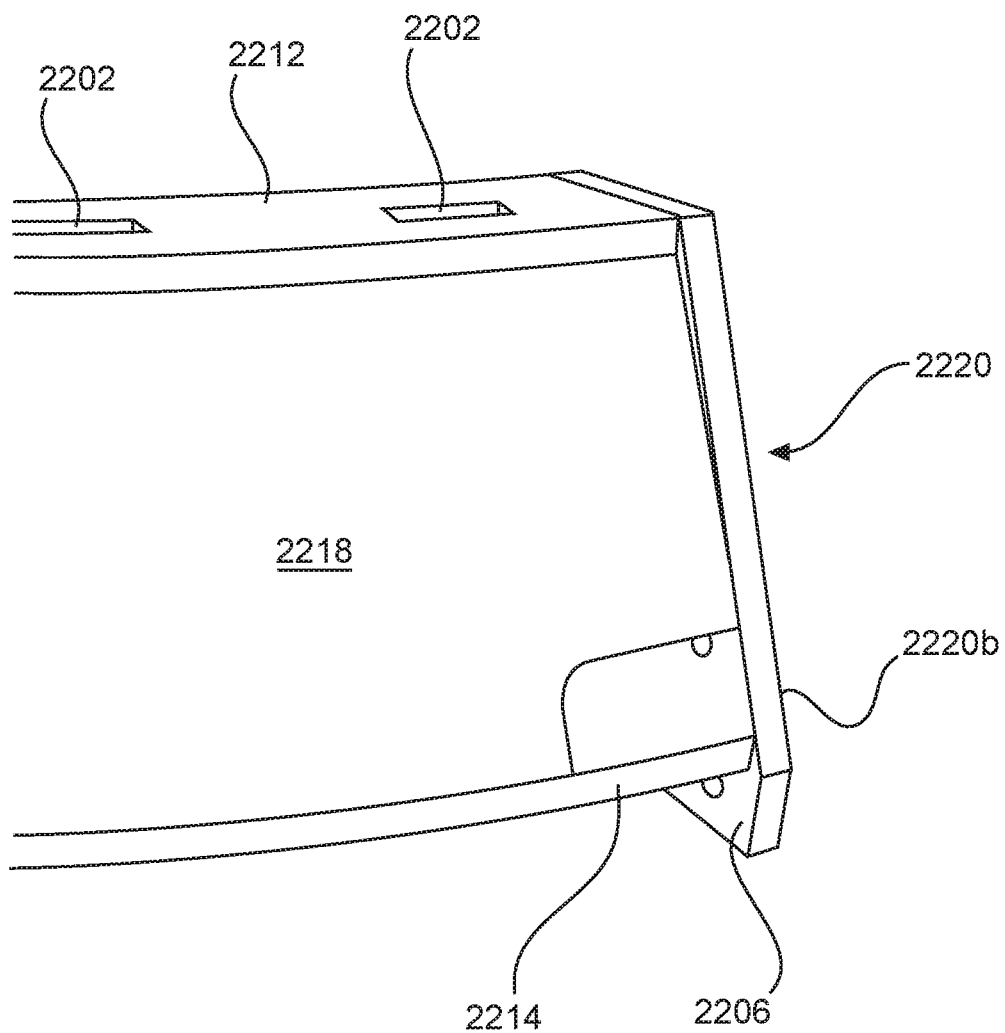
FIG. 11 shows a further three-dimensional partial view of the bracket segment according to FIG. 7.

FIG. 8 shows a three-dimensional view of a bracket segment 2200a of a further embodiment of an annular bracket, and FIGS. 9 to 11 show further three-dimensional partial views thereof. A plurality of bracket segments 2200a which are shown in FIG. 8 can be assembled to form an annular bracket.

The bracket segment 2200a has an upper belt 2212 with connector elements 2202 in the form of recesses, a lower belt 2214, and an outer web 2218 and a bearing element 2206. Unlike in the preceding embodiments, the bracket segment 2200a has a plurality of inner webs 2216.

The upper belt 2212, the inner webs 2216, the outer web 2218 and the lower belt 2214 are preferably connected to one another in an integrally joined manner.

The upper belt 2212 and/or the lower belt 2214 have/has substantially a horizontal flat extent in a respective plane of extent, which flat extent is arranged substantially orthogonally with respect to the longitudinal axis. The inner web 2216 has a flat extent in one of the respective planes of extent, which flat extent is arranged substantially parallel to the longitudinal axis LA of the annular bracket 2200 and radially with respect to the latter. The outer web 2218 is preferably arranged with its flat extent in a plane of extent substantially parallel to the longitudinal axis, and/or is arranged substantially parallel to the inner wall of the upper tower segment 103a.

The inner webs 2216 are preferably arranged equidistantly from one another in the circumferential direction. The inner webs 2216 are preferably arranged in the region of the introduction of the tensioning force, that is to say, in the region of the connector elements 2202. The inner web is particularly preferably arranged transversely with respect to the circumferential direction, that is to say, in the tangential direction, so as to adjoin the connector element 2202 between the underside of the upper belt 2212 and the upper side of the lower belt 2214.

On its end side, the bracket segment 2200a has a connecting arrangement 2220 in the circumferential direction, comprising a first fastening element 2220a which is arranged on the end side of the upper belt 2212 and/or on an upper section of the end side of the outer web 2218, and a second fastening element 2220b which is arranged on the end side of the lower belt 2214 and/or on a lower section of the end side of the outer web 2218. The connecting arrangement 2220 preferably comprises the first fastening element 2220a and the second fastening element 2220b as a flange for the end-side connection of a further bracket segment 2220a in the circumferential direction.

The bearing element 2206 of the bracket segment 2200a is not a bearing element which is continuous in the circumferential direction, as shown in the other embodiments. Rather, an annular bracket which is composed of a plurality of bracket segments 2200a has a plurality of bearing elements 2206 which are spaced apart from one another in the circumferential direction. The bearing elements 2206 extend in their main direction of extent substantially in the radial direction, the bearing element 2206 being arranged substantially transversely with respect to the circumferential direction on the lower side of the lower belt 2214. The bearing element 2206 is preferably configured integrally with the second fastening element 2220b. Furthermore, that projection of the second fastening element 2220b which extends downward beyond the lower belt 2214 in the longitudinal direction is the bearing element 2206. The bearing elements 2206 are preferably arranged equidistantly from one another in the circumferential direction. Furthermore, the bearing elements 2206 are preferably arranged in the circumferential direction in the region of the introduction of the tensioning force, that is to say, of the connector elements 2202. If the bearing element 2206 is configured with the second fastening element 2220b and/or the second fastening element 2220b is also configured as a bearing element, the annular bracket preferably has bearing elements 2206 in the region of the respective connecting arrangement 2220.

Figure 12:
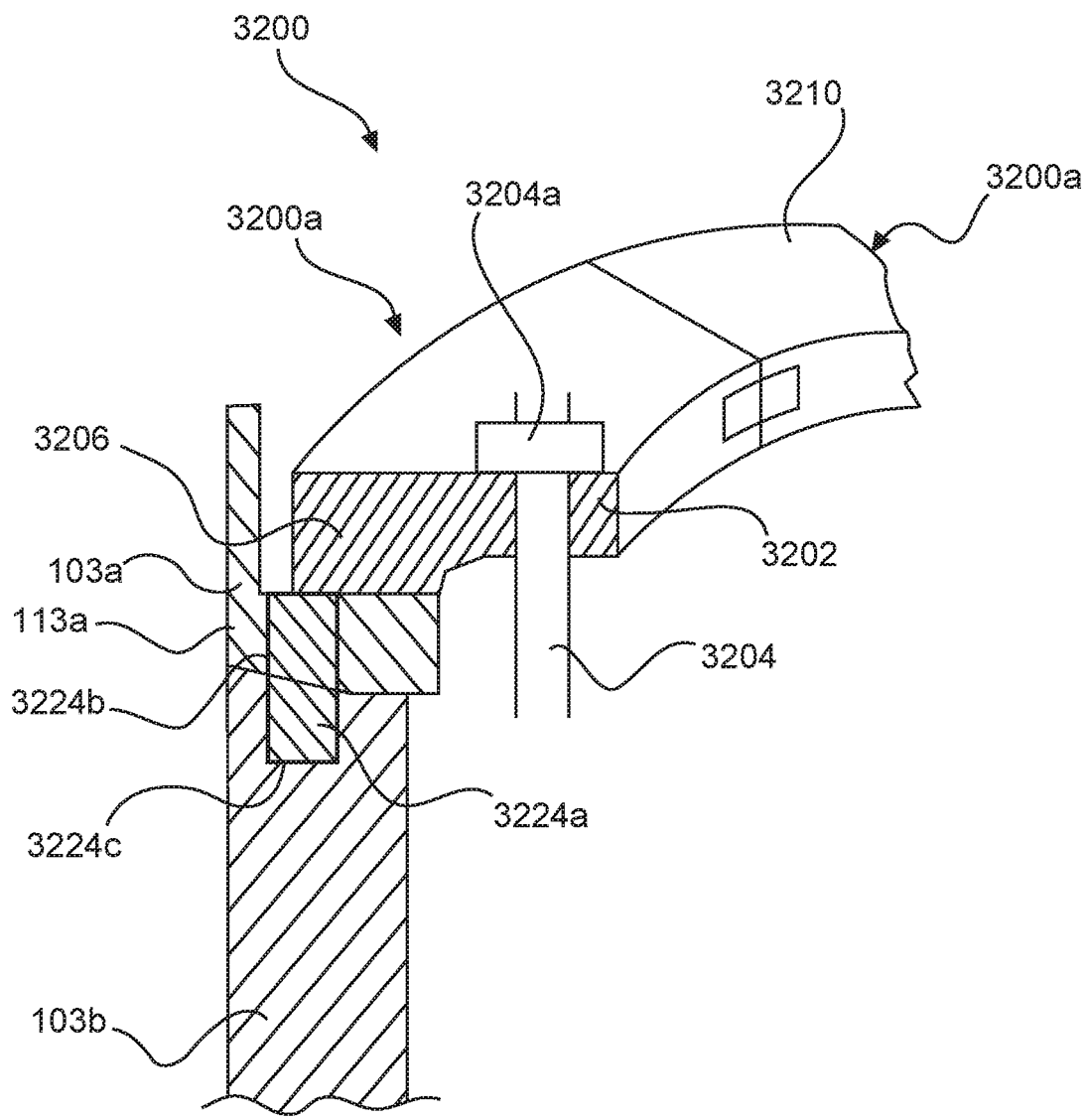
FIG. 12 shows a part of a further annular bracket in cross section.
Figure 13A:
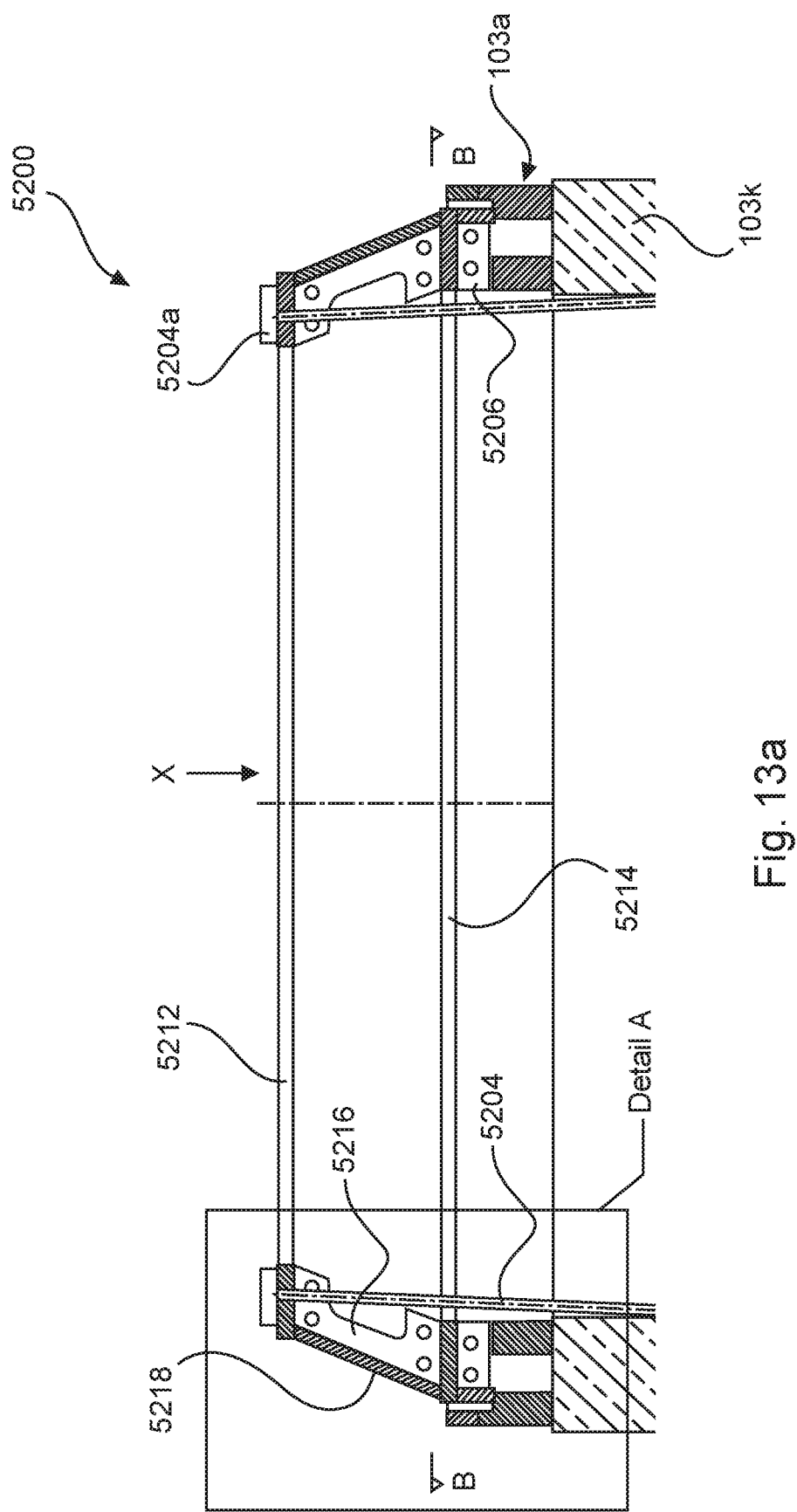
FIG. 13a shows a cross section through a further embodiment of an annular bracket.
Figure 13B:
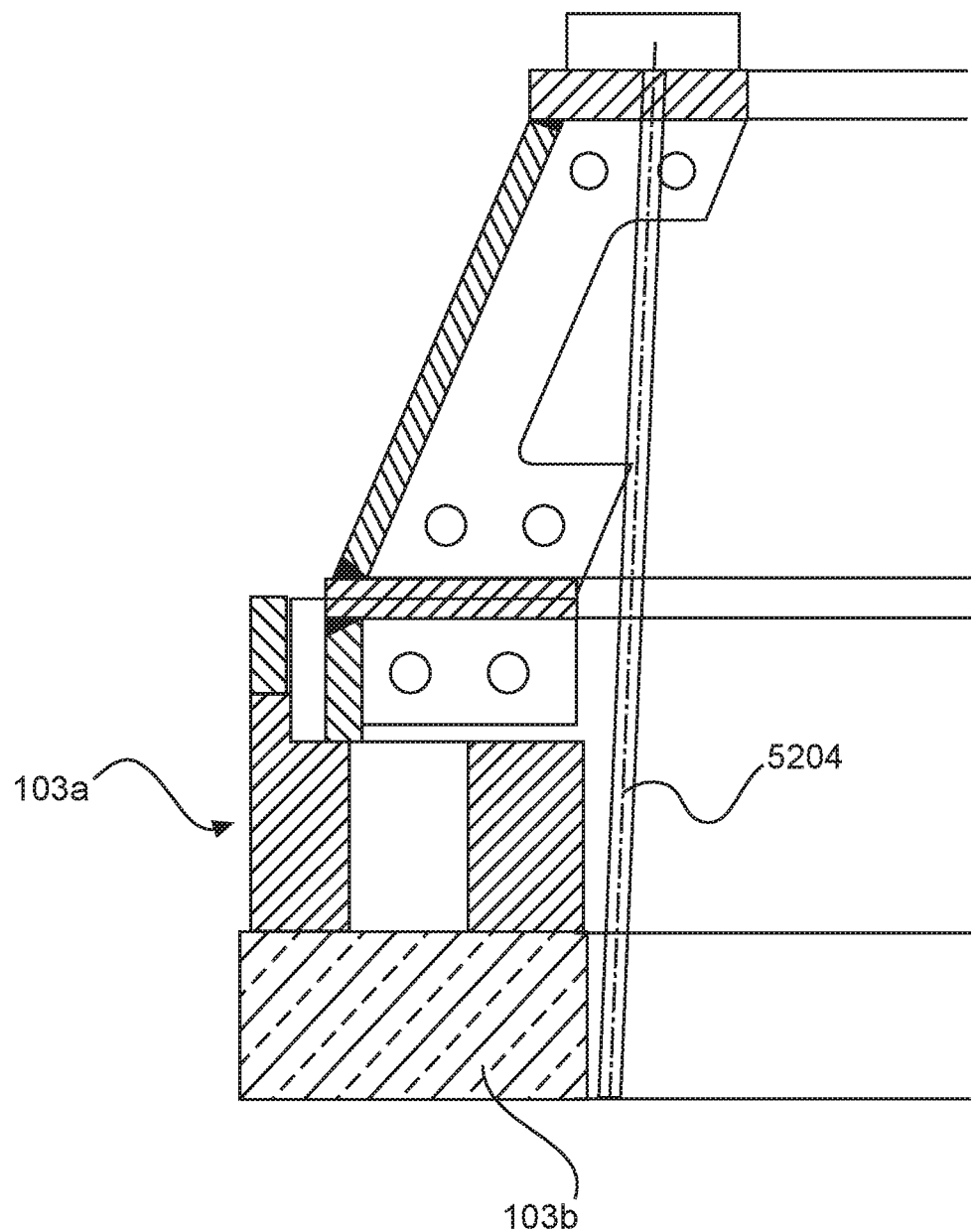
FIG. 13b shows an enlarged illustration of detail A from FIG. 13a, FIG. 13c shows a plan view of the annular bracket according to FIG. 13a, FIG. 13d shows a cross section along the sectional plane B-B from FIG. 13a, FIG. 13e shows a cross section along the sectional plane A-A from FIGS. 13c and d.
Figure 13C:
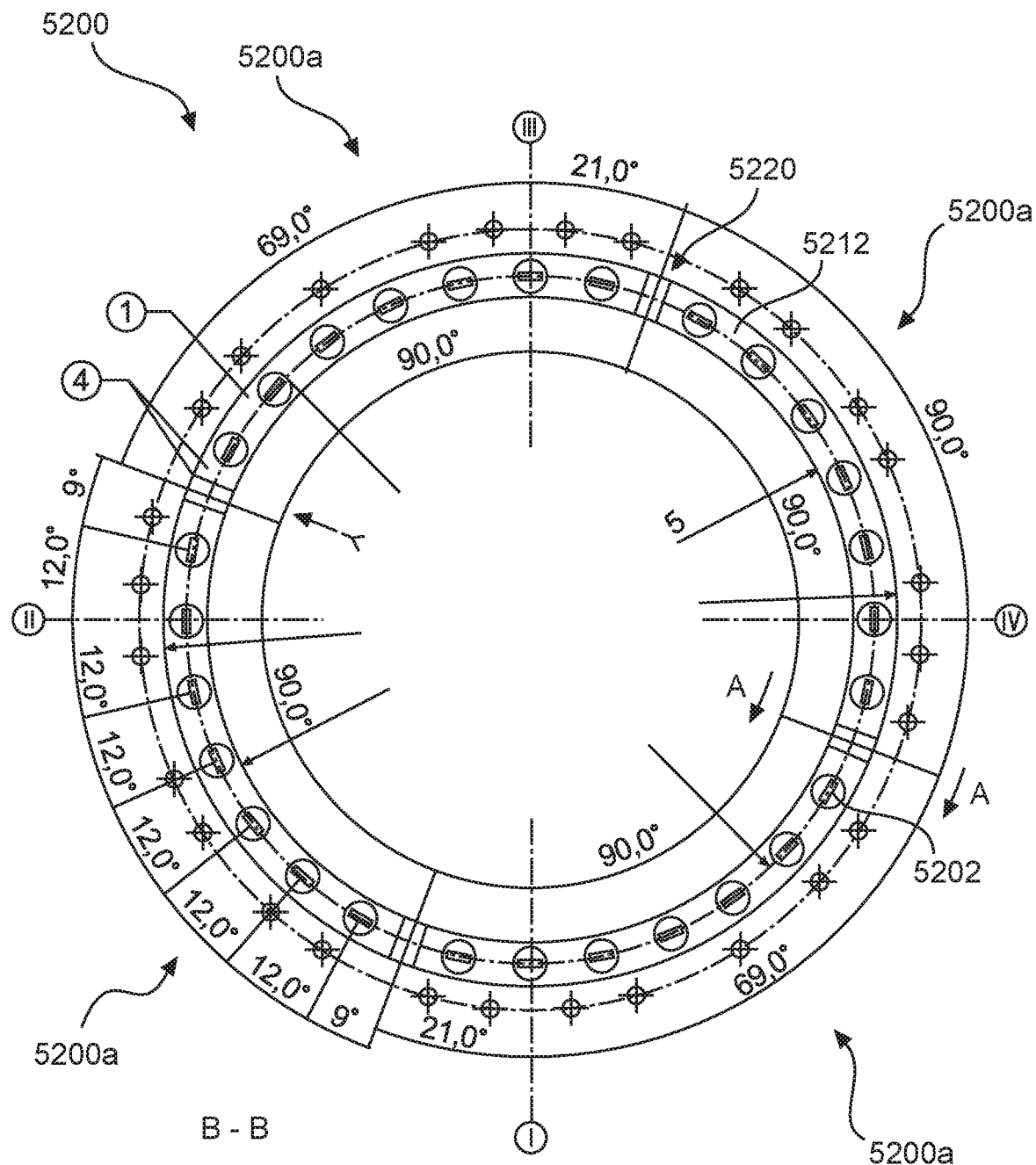
FIG. 13f shows a view in the direction Y from FIG. 13c.
FIG. 13g shows an enlarged illustration of the detail of a connector element according to FIG. 13c.
FIG. 13h shows a view in the direction Z from FIG. 13d.
FIG. 13i shows a detailed view of an inner web.
FIG. 13j shows a detailed view of a bracing means.
FIG. 13k shows the bracing means from FIG. 13i in the installed state.
Figure 13D:
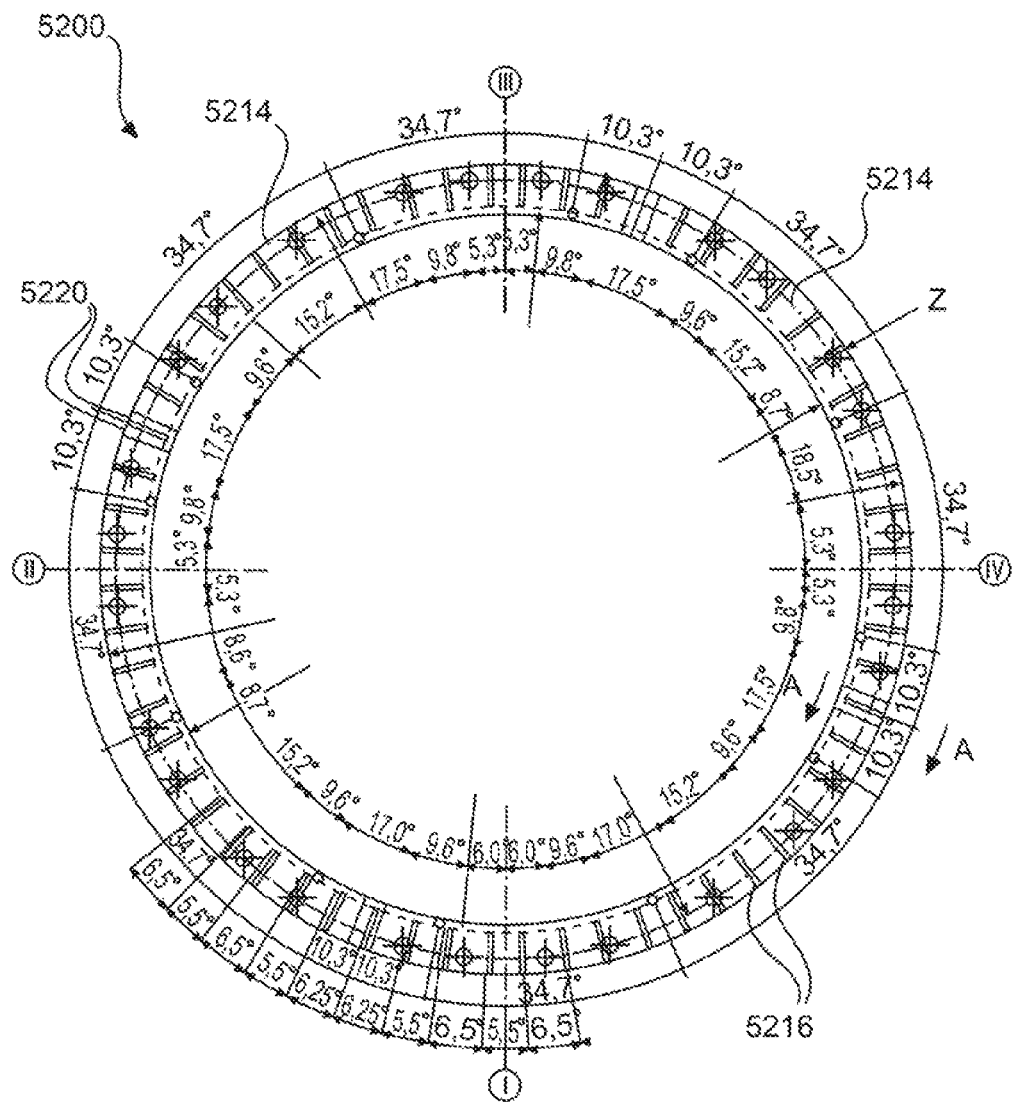
Figure 13E:
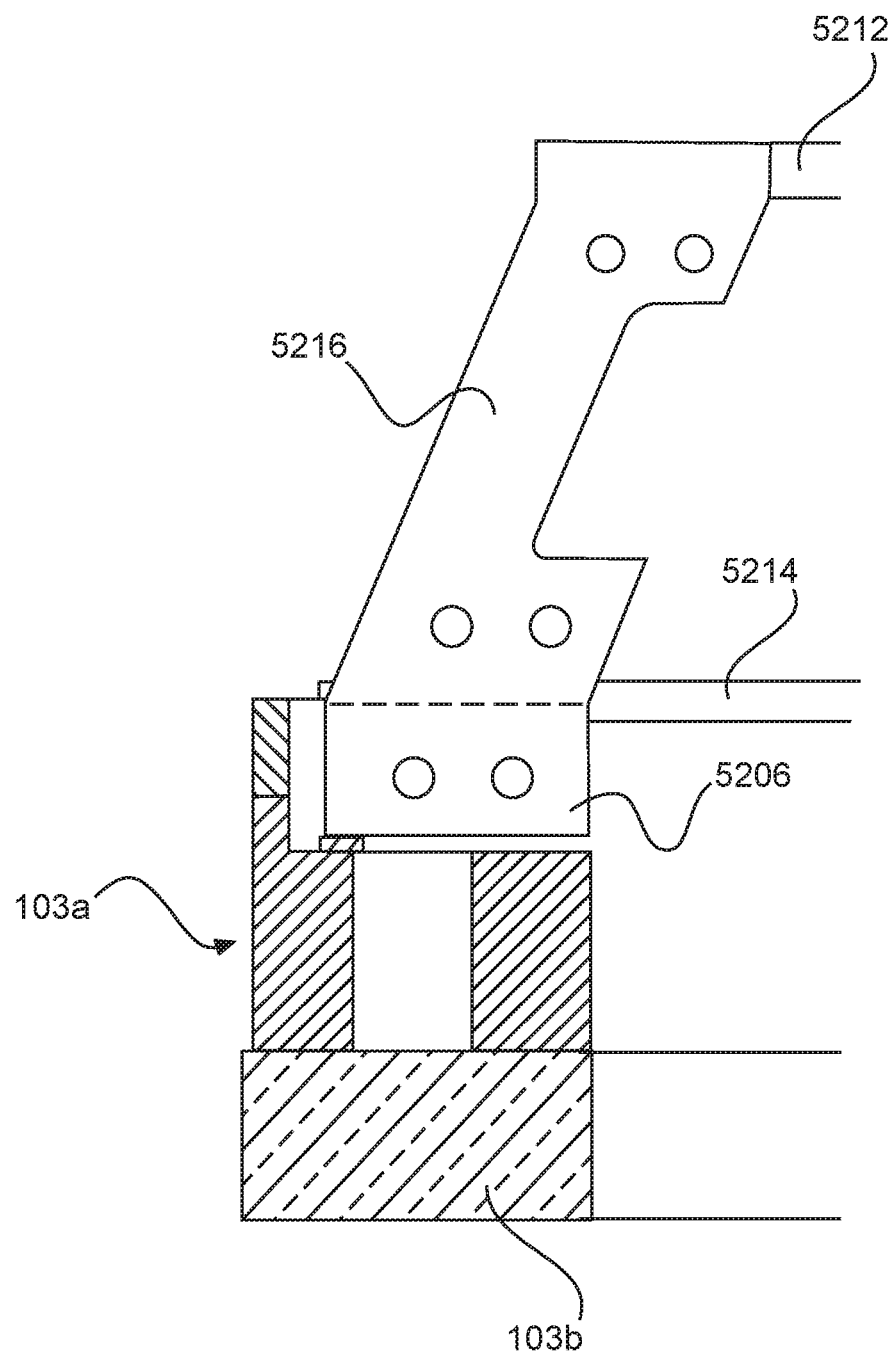
Figure 13F:
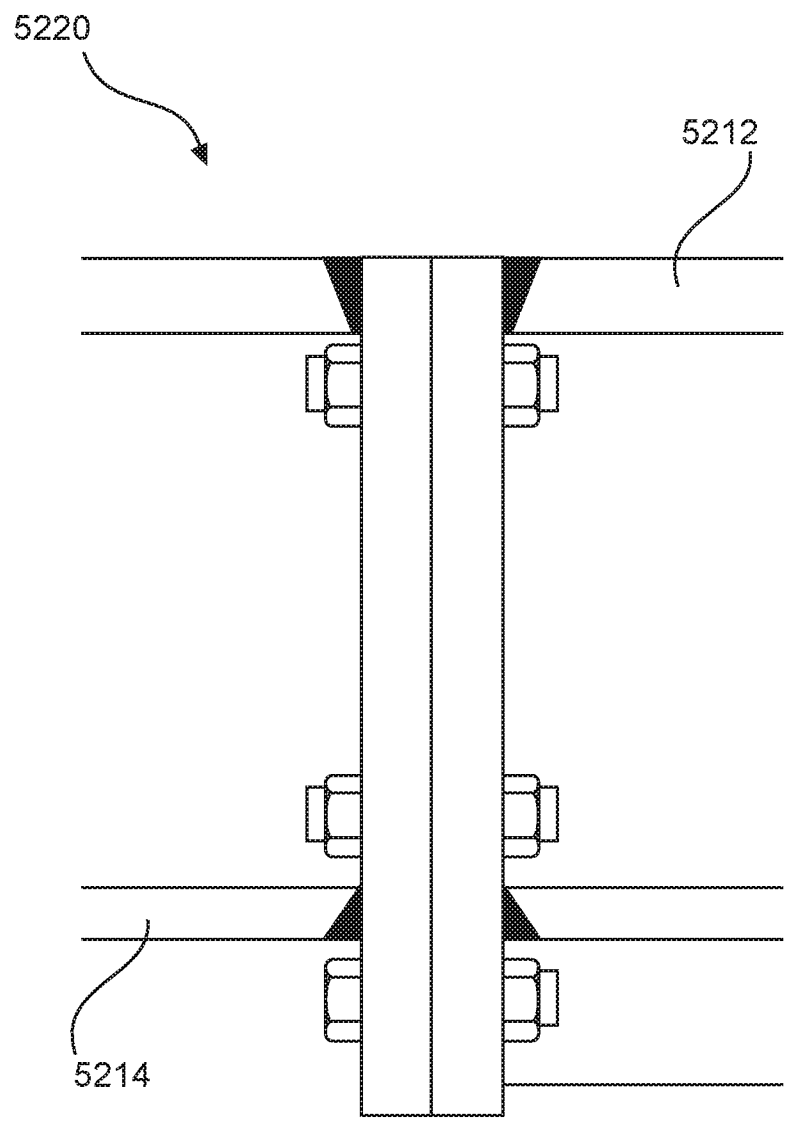
Figure 13G:
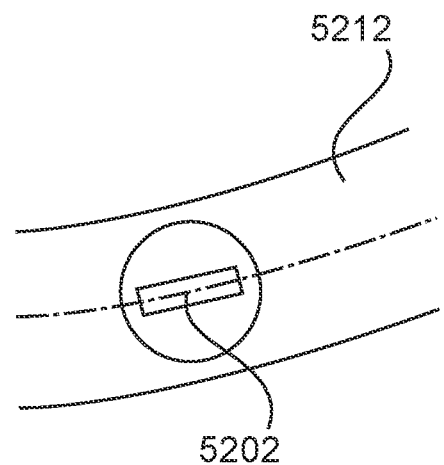
Figure 13H:
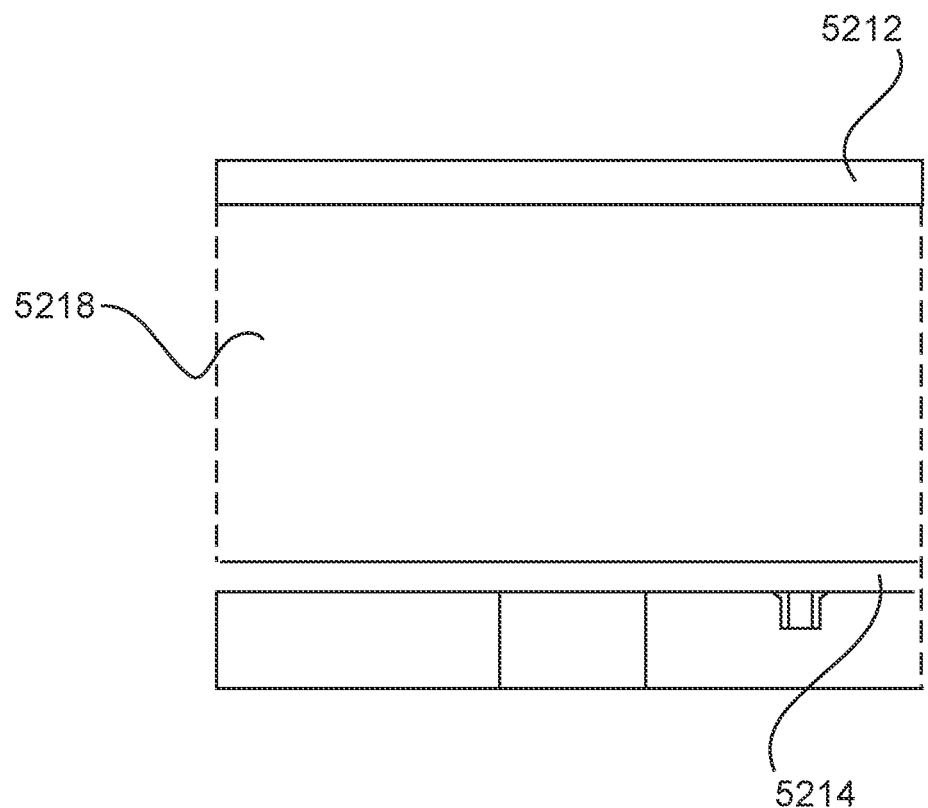
Figure 13I:
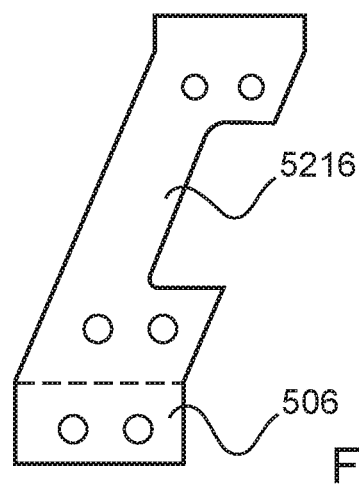
Figure 13J:
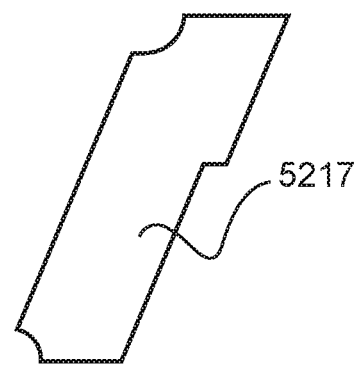
Figure 13K:
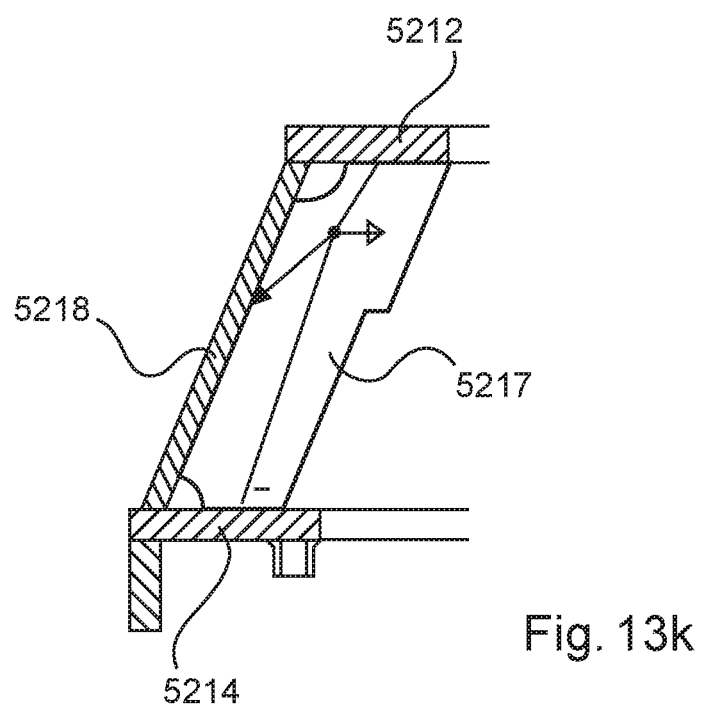

FIG. 12 shows an annular bracket 3200 which is arranged on the upper side of the inwardly directed shoulder 113a of the upper tower segment 103a and preferably comprises prestressed concrete and/or reinforced concrete. For transport and/or assembly reasons, the annular bracket 3200 comprises a plurality of bracket segments 3200a. The bracket segments 3200a are preferably connected to one another in a positively locking and/or non-positive manner, for example, by way of a plug-in and/or screw connection.

That design variant of an annular bracket 3200 or the bracket segments 3200a shown in FIG. 12 integrally comprises both a connector element 3202 and a bearing element 3206. The connector element 3202 is configured as a through opening which is arranged substantially in the longitudinal direction with respect to the longitudinal axis for receiving a tensioning element 3204, the connector element 3202 being arranged spaced apart from the longitudinal axis at a spacing which is greater than the internal radius of the annular bracket 3200 and is smaller than the internal radius of the inner edge of the inwardly directed shoulder 113a of the upper tower segment 103a and/or the lower tower segment 103b. The bearing element 3206 is preferably configured integrally as a step and/or projection on the annular bracket 3200 or the bracket segments 3200a, substantially in the longitudinal direction. Furthermore, the bearing element 3206 extends substantially continuously in the circumferential direction. The bearing element 3206 preferably extends in the radial direction in the outer half and particularly preferably in the outer third of the annular bracket 3200 or the bracket segments 3200a.

In addition, FIG. 12 shows a thrust latch arrangement. Here, the annular bracket 3200 configures thrust mandrels 3224a as a bracket thrust latch arrangement in the longitudinal direction in the region of the bearing element 3206. The tower segment thrust latch arrangement of the upper tower segment 103a is configured as a through opening 3224b, and the tower segment thrust latch arrangement of the lower tower segment 103b is configured as a blind bore 3224c, which opening 3224b and bore 3224c in each case receive the thrust mandrel 3224a of the bracket thrust latch arrangement. By means of the thrust latch arrangement, an arrangement of the lower tower segment 103b, the upper tower segment 103a and the annular bracket 3200 is ensured with a defined angular position with respect to one another. Furthermore, the thrust latch arrangement prevents or reduces relative movements in the radial and/or tangential direction between the lower tower segment 103b and/or the upper tower segment 103a and/or the annular bracket 3200.

FIGS. 13a to 13k show a further embodiment of an annular bracket 5200 with four bracket segments 5200a. The annular bracket 5200 has an upper belt 5212 with connector elements 5202 in the form of recesses, a lower belt 5214, and an outer web 5218 and a plurality of bearing elements 5206. The connector elements 5202 are configured as through openings which are arranged substantially in the longitudinal direction with respect to the longitudinal axis for receiving tensioning elements 5204.

Just like the exemplary embodiment according to FIG. 8, the annular bracket 5200 has a plurality of inner webs 5216. Said inner webs 5216 are preferably reinforced additionally by way of bracing means 5217.

The upper belt 5212, the inner webs 5216, the outer web 5218 and the lower belt 5214 are preferably connected to one another in an integrally joined manner, for example, by way of welding.

The upper belt 5212 and the lower belt 5214 have a substantially horizontal flat extent which is arranged substantially orthogonally with respect to the longitudinal axis, in a respective plane of extent. The inner web 5216 has a flat extent which is arranged substantially parallel to the longitudinal axis LA of the annular bracket 5200 and radially with respect to the latter, in one of the respective planes of extent. The outer web 5218 is preferably arranged with its flat extent in a plane of extent substantially parallel to the longitudinal axis, and/or is arranged substantially parallel to the inner wall of the upper tower segment 103a.

The annular bracket 5200 has a plurality of connecting arrangements 5220 which serve to connect the bracket segments 5200a to one another to form the annular bracket 5200.

The bearing elements 5206 of the annular bracket 5200 extend in their main direction of extent substantially in the radial direction, the bearing elements 5206 being arranged substantially transversely with respect to the circumferential direction on the underside of the lower belt 5214.

The invention claimed is:

1. An annular bracket for external tensioning of a tower segment, comprising:
   a connector element for connecting a tensioning element;
   a bearing element for transmitting a tensioning force to the tower segment; and
   an annular force transmission element for transmitting the tensioning force between the connector element and the bearing element,
   wherein the bearing element is at a greater spacing, in a radial direction, from a longitudinal axis of the annular bracket than the connector element, and
   wherein a spacing of the bearing element from the longitudinal axis in the radial direction is less than an external radius of the tower segment and is greater than an internal radius of the tower segment.

2. The annular bracket as claimed in claim 1, wherein a spacing of the connector element from the longitudinal axis in the radial direction is less than or equal to the internal radius of the tower segment.

3. The annular bracket as claimed in claim 1, wherein the annular force transmission element has an upper belt and a lower belt.

4. The annular bracket as claimed in in claim 1, wherein the annular force transmission element has an inner web and an outer web.

5. The annular bracket as claimed in claim 4, wherein the inner web has a through opening for receiving the tensioning element, the outer web has a through opening for receiving the tensioning element.

6. The annular bracket as claimed in claim 1, wherein the annular force transmission element comprises one or more thrust mandrel for engaging with openings of the annular force transmission element.

7. The annular bracket as claimed in claim 1, wherein the annular force transmission element is a single integral piece or is made from a plurality of bracket segments.

8. The annular bracket as claimed in claim 1, wherein the annular force transmission element is a plurality of bracket segments having a connecting arrangement for connecting the plurality of bracket segments among one another on at least one end side in a circumferential direction.

9. The annular bracket as claimed in claim 1, wherein the annular bracket comprises one or more materials among: steel, cast iron, and concrete.

10. The annular bracket as claimed in claim 1, wherein the tower segment is a tower segment of a wind power plant.

11. The annular bracket as claimed in claim 1, wherein the annular force transmission element has an upper belt having a through opening for receiving the tensioning element.

12. An external tensioning system of a hybrid tower, comprising:
the annular bracket as claimed in claim 1; and
the tensioning element having a connector head at a first end for transmitting a tensioning force to the connector element, and a brace at a second end for transmitting the tensioning force to a lower tower segment.

13. A wind power plant, comprising the hybrid tower as claimed in claim 12.

14. A tower section of a hybrid tower, comprising:
an upper tower segment with a radially inwardly directed shoulder;
the annular bracket as claimed in claim 1, wherein the annular bracket forms part of an external tensioning system, wherein the annular bracket is arranged on the radially inwardly directed shoulder in an interior portion of the upper tower segment;
a lower tower segment arranged below the upper tower segment; and
the tensioning element arranged using a brace of the external tensioning system, the tensioning element being configured for bracing the tower section.

15. A hybrid tower, comprising the tower section as claimed in claim 14.

16. A method of assembling an external tensioning system for a hybrid tower, comprising:
arranging an annular bracket with a bearing element of the external tensioning system on a shoulder in an interior of an upper tower segment;
fastening the annular bracket with the bearing element of the external tensioning system on the shoulder in the interior of the upper tower segment;
arranging a tensioning element with a connector head of the external tensioning system on a connector element of the annular bracket;
fastening the tensioning element with the connector head of the external tensioning system to the connector element of the annular bracket;
arranging the tensioning element by a brace of the external tensioning system on a lower tower segment; and
fastening the tensioning element by the brace of the external tensioning system on the lower tower segment,
wherein a spacing of the bearing element from a longitudinal axis in a radial direction is less than an external radius of a tower segment and is greater than an internal radius of the tower segment.

17. The method of claim 16, wherein the hybrid tower is a wind power plant.

\* \* \* \* \*

UNITED STATES PATENT AND TRADEMARK OFFICE
CERTIFICATE OF CORRECTION

PATENT NO. : 11,136,780 B2
APPLICATION NO. : 16/757956
DATED : October 5, 2021
INVENTOR(S) : Roy Kersten et al.

Page 1 of 1

It is certified that error appears in the above-identified patent and that said Letters Patent is hereby corrected as shown below:

On the Title Page

Item (72) Inventors:
Second inventor "Steffen Röthel, Emden (DE)" should read --Steffen Röthel, Rostock (DE)--.

In the Claims

Column 22, Claim 4, Line 49:
"as claimed in in claim 1," should read --as claimed in claim 1,--.

Signed and Sealed this
Twenty-first Day of February, 2023

Katherine Kelly Vidal
*Director of the United States Patent and Trademark Office*